(12) United States Patent
Youn et al.

(10) Patent No.: US 11,528,763 B2
(45) Date of Patent: Dec. 13, 2022

(54) METHOD OF PROCESSING ESTABLISHMENT OF MA PDU SESSION, AND AMF NODE AND SMF NODE

(71) Applicant: LG ELECTRONICS INC., Seoul (KR)

(72) Inventors: Myungjune Youn, Seoul (KR); Laeyoung Kim, Seoul (KR); Hyunsook Kim, Seoul (KR); Jinsook Ryu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 52 days.

(21) Appl. No.: 16/967,688

(22) PCT Filed: Feb. 11, 2019

(86) PCT No.: PCT/KR2019/001604
§ 371 (c)(1),
(2) Date: Aug. 5, 2020

(87) PCT Pub. No.: WO2019/160278
PCT Pub. Date: Aug. 22, 2019

(65) Prior Publication Data
US 2021/0037585 A1 Feb. 4, 2021

Related U.S. Application Data

(60) Provisional application No. 62/789,950, filed on Jan. 8, 2019, provisional application No. 62/629,713, filed on Feb. 13, 2018.

(30) Foreign Application Priority Data

Nov. 13, 2018 (KR) ........................ 10-2018-0139346

(51) Int. Cl.
H04W 76/15 (2018.01)
H04W 76/30 (2018.01)
(Continued)

(52) U.S. Cl.
CPC ............. *H04W 76/15* (2018.02); *H04W 8/08* (2013.01); *H04W 48/16* (2013.01); *H04W 48/18* (2013.01); *H04W 60/06* (2013.01); *H04W 76/30* (2018.02)

(58) Field of Classification Search
None
See application file for complete search history.

(56) References Cited

U.S. PATENT DOCUMENTS

2019/0274178 A1* 9/2019 Salkintzis ............. H04W 76/16
2020/0178196 A1* 6/2020 Wang .................... H04W 76/16

FOREIGN PATENT DOCUMENTS

WO 2018/006017 1/2018

OTHER PUBLICATIONS

PCT International Application No. PCT/KR2019/001604, International Search Report dated May 17, 2019, 2 pages.
(Continued)

*Primary Examiner* — German Viana Di Prisco
(74) *Attorney, Agent, or Firm* — Lee, Hong, Degerman, Kang & Waimey PC

(57) ABSTRACT

A disclosure of the present specification provides a method for processing establishment of a protocol data unit (PDU) session by an access and mobility management function (AMF) node. The method may include a step of receiving a PDU session establishment request message from a user equipment (UE) via either a first access or a second access. The PDU session establishment request message may include information indicative of a multi access (MA) PDU session. The method may include a step of selecting a
(Continued)

session management function (SMF) node supporting the MA PDU session on the basis of the information indicative of the MA PDU session. The method may include a step of sending the PDU session establishment request message to the SMF node supporting the MA PDU session.

15 Claims, 19 Drawing Sheets

(51) Int. Cl.
    *H04W 8/08*        (2009.01)
    *H04W 48/16*      (2009.01)
    *H04W 48/18*      (2009.01)
    *H04W 60/06*      (2009.01)

(56) References Cited

OTHER PUBLICATIONS

InterDigital Inc., "UE Requested Multi-access PDU Session Establishment," SA WG2, Meeting #125, S2-180449, Gothenburg, Sweden, Jan. 22-26, 2018, 6 pages.
3GPP; TSG SA; Study on Access Traffic Steering Switching and Splitting support in the 5G system architecture (Release 16), 3GPP TR 23.793, V0.2.0 (Jan. 2018), 20 pages.
Motorola et al, "Establishment of MA-PDU Sessions," SA WG2, Meeting #125, S2-180273, Gothenburg, Sweden, Jan. 22-26, 2018, 5 pages.
ETRI, "23.793: UE Requested Multi-access PDU Session Establishment," SA WG2, Meeting #125, S2-180765, Gothenburg, Sweden, Jan. 22-26, 2018, 5 pages.

* cited by examiner

METHOD OF PROCESSING ESTABLISHMENT OF MA PDU SESSION, AND AMF NODE AND SMF NODE

CROSS-REFERENCE TO RELATED APPLICATIONS

This application is the National Stage filing under 35 U.S.C. 371 of International Application No. PCT/KR2019/001604, filed on Feb. 11, 2019, which claims the benefit of U.S. Provisional Application No. 62/629,713, filed on Feb. 13, 2018, 62/789,950, filed on Jan. 8, 2019, and also claims the benefit of earlier filing date and right of priority to Korean Application No. 10-2018-0139346, filed on Nov. 13, 2018, the contents of which are all hereby incorporated by reference herein in their entirety.

BACKGROUND OF THE DISCLOSURE

Field of the Disclosure

The present disclosure relates to a next mobile communication.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
| --- | --- |
| S1-MME | A reference point for a control plane protocol between the E-UTRAN and the MME |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer |

TABLE 1-continued

| REFER-ENCE POINT | DESCRIPTION |
|---|---|
| | information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

<Next-Generation Mobile Communication Network>

With the success of long term evolution (LTE)/LTE-A (LTE-Advanced) for the 4th generation mobile communication, more interest is rising to the next generation, i.e., 5th generation (also known as 5G) mobile communication and extensive research and development are being carried out accordingly.

The 5G mobile communication defined in the international telecommunication union (ITU) provides a data transfer rate of up to 20 Gbps and a sensible transfer rate of at least 100 Mbps anytime anywhere. 'IMT-2020' is a formal name, and aims to be commercialized in the year 2020 worldwide.

The ITU proposes three usage scenarios, e.g., eMBB (enhanced Mobile BroadBand), mMTC (massive Machine Type Communication), and URLLC (Ultra Reliable and Low Latency Communications).

First, the URLLC relates to a usage scenario which requires a high reliability and a low latency. For example, a service such as autonomous driving, factory automation, and augmented reality requires a high reliability and a low latency (e.g., a latency less than or equal to 1 ms). At present, a latency of 4G (LTE) is statistically 21-43 ms (best 10%), 33-75 ms (median). This is insufficient to support a service requiring the latency less than or equal to 1 ms.

Next, an eMBB usage scenario relates to a usage scenario requiring a mobile ultra-wide band.

It seems that a core network designed for the existing LTE/LTE-A has difficulty in accommodating a high-speed service of the ultra-wide band.

Therefore, it is urgently required to re-design the core network in 5G mobile communication.

FIG. 2 shows an example of an expected structure of next-generation mobile communication from a node perspective.

As can be seen with reference to FIG. 2, a UE is coupled to a data network (DN) via a next generation radio access network (RAN).

The illustrated control plane function (CPF) node performs the entirety or part of a mobility management entity (MME) function of 4G mobile communication and the entirety or part of a control plane function of an S-serving gateway (SG) and PDN gateway (P-GW). The CPF node includes an access and mobility management function (AMF) and a session management function (SMF).

The illustrated user plane function (UPF) node is a type of a gateway through which user data is transmitted/received. The UPF node may perform the entirety or part of a user plane function of an S-GW or P-GW of 4G mobile communication.

The illustrated policy control function (PCF) is a node which controls a provider's policy.

The illustrated application function (AF) is a server for providing several services to the UE.

The illustrated unified data management (UDM) is a type of a server which manages subscriber information, such as a home subscriber server (HSS) of 4G mobile communication. The UDM stores the subscriber information in a unified data repository (UDR) and manages it.

The illustrated authentication server function (AUSF) authenticates and manages the UE.

The illustrated network slice selection function (NSSF) is a node for network slicing as described below.

In FIG. 2, the UE can simultaneously access two data networks by using multiple protocol data unit or packet data unit (PDU) sessions.

FIG. 3 shows an example of an architecture for supporting simultaneous access to two data networks.

In the architecture shown in FIG. 3, a UE uses one PDU session to simultaneously access the two data networks.

<Network Slice>

The following describes the slicing of the network to be introduced in the next generation mobile communication.

Next-generation mobile communication introduces the concept of network slicing in order to provide various services through a single network. In this connection, slicing a network refers to a combination of network nodes with the functions needed to provide a specific service. The network node that constitutes the slice instance may be a hardware independent node, or it may be a logically independent node.

Each slice instance may consist of a combination of all the nodes needed to construct the entire network. In this case, one slice instance alone may provide service to the UE.

Alternatively, the slice instance may consist of a combination of some of the nodes that make up the network. In this case, the slice instance may provide service to the UE in association with other existing network nodes without the slice instacne alone providing the service to the UE. In addition, a plurality of slice instances may cooperate with each other to provide the service to the UE.

The slice instance may differ from a dedicated core network in that all network nodes, including the core network (CN) node and the RAN may be separated from each other. Further, the slice instance differs from the dedicated core network in that the network nodes may be logically separated.

FIG. 4A is an exemplary diagram illustrating an example of an architecture for implementing the concept of network slicing.

As can be seen from FIG. 4A, the core network (CN) may be divided into several slice instances. Each slice instance may contain one or more of a CP function node and a UP function node.

Each UE may use a network slice instance corresponding to its service through RAN.

Unlike the case shown in FIG. 4A, each slice instance may share one or more of a CP function node, and a UP function node with another slice instance. This will be described with reference to FIG. 4B below.

FIG. 4B is an exemplary view showing another example of an architecture for implementing the concept of network slicing.

Referring to FIG. 4B, a plurality of UP function nodes are clustered, and a plurality of CP function nodes are also clustered.

Further, referring to FIG. 4B, slice instance #1 (or instance #1) in the core network includes a first cluster of an UP function node. Moreover, the slice instance #1 shares the cluster of the CP function node with slice instance #2 (or instance #2). The slice instance #2 includes a second cluster of an UP function node.

The illustrated NSSF selects a slice (or instance) that can accommodate the UE's service.

The illustrated UE may use the service #1 via the slice instance #1 selected by the NSSF and may use the service #2 via the slice instance #2 selected by the NSSF.

<Roaming in Nest Generation Mobile Network>

Meanwhile, there are two types of a method for processing a signaling request from a UE while the UE roams to a visit network, for example, a visited public land mobile network (VPLMN). The first method is a local break out (LBO) method in which the signaling request from the UE is processed at the network. The second method is a home routing (HR) method in which the visit network transmit the signaling request from the UE to a home network of the UE.

FIG. 5A is a diagram illustrating an example of architecture to which the LBO method is applied during roaming, and FIG. 5B is a diagram illustrating an example of architecture to which the HR method is applied during roaming.

As illustrated in FIG. 5A, in the architecture to which the LBO method is applied, data of a user is transmitted to a data network in the VPLMN. To this end, a PCF in the VPLMN performs an interaction with an AF to create a PCC rule for a service in the VPLMN. A PCF node in the VPLMN creates the PCC rule based on a policy that is set according to a roaming agreement with a home public land mobile network (HPLMN) operator.

As illustrated in FIG. 5B, in the architecture to which the HR method is applied, the data of the UE is transmitted to the data network in the HPLMN.

<Data Offloading to Non-3GPP Network>

In next-generation mobile communication, data of a UE may be offloaded to a non-3GPP network, for example, a wireless local area network (WLAN) or a Wi-Fi.

FIGS. 6A to 6F illustrate architectures for offloading data to the non-3GPP network.

A WLAN or a Wi-Fi is regarded as an untrusted non-3GPP network. In order to connect the non-3GPP network to a core network, a non-3GPP interworking function (N3IWF) may be added.

Meanwhile, a PDU session may be established through a 3GPP access and a non-3GPP access. As such, an idea that suggests establishing a multi-access (MA) PDU session by bundling two separate PDU sessions established through the different accesses has been proposed.

Yet, a detailed method for establishing an MA PDU session and a method for efficiently managing an MA PDU session has not been discussed, and thus, it was not possible to carry out the idea.

SUMMARY OF THE DISCLOSURE

The disclosures of the specification has been made in an effort to solve the above-described problems.

To achieve the foregoing aspect, a disclosure of the present specification provides a method for processing protocol data unit (PDU) session establishment by an access and mobility management function (AMF) node. The method may include receiving a PDU session establishment request message from a user equipment (UE) through any one of first access and second access. The PDU session establishment request message may include information indicating a multi-access (MA) PDU session. The method may include selecting a session management function (SMF) node supporting an MA PDU session based on the information indicating the MA PDU session. The method may include delivering the PDU session establishment request message to the SMF node supporting the MA PDU session.

The method may further include generating context of a PDU session based on the information indicating the MA PDU session. The context of the PDU session may include an access type. The access type may indicate both the first access and the second access.

The delivering of the PDU session establishment request message may include delivering one or more of information indicating whether the UE is registered over both the first access and the second access or is registered over only one thereof and information indicating whether the UE is in an idle state or a connected state.

The PDU session establishment request message may include session network slice selection assistance information (S-NSSAI), and the delivering of the PDU session establishment request message may include delivering allowed NSSAI for each access.

The method may further include: identifying S-NSSAI of the MA PDU session is comprised in allowed NSSAI for corresponding access when the UE is registered through only any one of the first access and the second access and when the UE is registered through another access; and transmitting a request for release of the MA PDU session to the SMF node when the S-NSSAI of the MA PDU session is comprised in the allowed NSSAI for the corresponding access.

The method may further include: receiving a registration request message comprising a list of a PDU session to be activated from the UE when the UE is not registered over the second access; and delivering necessity of activating the MA PDU session to the SMF node based on the list.

The method may further include: receiving a request for notification from the SMF node in occurrence of a first event in which the UE is registered through the second access or in occurrence of a second event of a switch to a connected state occurs when user plane setup for the MA PDU session is performed first through only the first access; and transmitting a notification to the SMF node when the first event or second event occurs.

The first access may be 3rd Generation Partnership Project (3GPP) access and the second access may be non-3GPP access, or the first access may be non-3GPP access and the second access may be 3GPP access.

To achieve the foregoing aspect, a disclosure of the present specification provides a method for processing protocol data unit (PDU) session establishment by a session management function (SMF) node. The method may include receiving, from an access and mobility management function (AMF) node, a PDU session establishment request message from a user equipment (UE). Te PDU session establishment request message may include information indicating a multi-access (MA) PDU session including first access and second access. The method may include generating an MA PDU session through any one of the first access and the second access or through both thereof based on the information indicating the MA PDU session; and delivering a PDU session establishment acceptance message.

The receiving of the PDU session establishment request message may include receiving one or more of information indicating whether the UE is registered over both the first access and the second access or is registered over only one thereof and information indicating whether the UE is in an idle state or a connected state.

The receiving of the PDU session establishment request message may include receiving one or more of session network slice selection assistance information (S-NSSAI) and allowed NSSAI for each access.

The method may further include: transmitting a request for notification to the AMF node in occurrence of a first event in which the UE is registered through the second access or in occurrence of a second event of a switch to a connected state occurs when user plane setup for the MA PDU session is performed first through only the first access; and receiving a notification from the AMF node when the first event or second event occurs.

The generating of the MA PDU session may include: performing user plane setup for the first access; and performing user plane setup for the second access.

The PDU session establishment acceptance message may include information indicating access for which user plane setup is performed among the first access and the second access.

The method may further include: performing user plane setup for the second access when the UE is registered over the second access in a case where the MA PDU session is generated through only the first access in the generating of the MA PDU session.

The method may further include: transmitting a request for notification to the AMF node in occurrence of a first event in which the UE is registered through the second access or in occurrence of a second event of a switch to a connected state occurs in a case where the MA PDU session is generated through only the first access in the generating of the MA PDU session.

To achieve the foregoing aspect, a disclosure of the present specification provides an access and mobility management function (AMF) node for processing protocol data unit (PDU) session establishment. The AMF node may include: a transceiver; and a processor to control the transceiver to receive a PDU session establishment request message from a user equipment (UE) through any one of first access and second access. The PDU session establishment request message may include information indicating a multi-access (MA) PDU session. The processor may select a session management function (SMF) node supporting an MA PDU session based on the information indicating the MA PDU session. The processor may delivery the PDU session establishment request message to the SMF node supporting the MA PDU session.

To achieve the foregoing aspect, a disclosure of the present specification provides a session management function (SMF) node for processing protocol data unit (PDU) session establishment. The SMF node may include: a transceiver; and a processor to control the transceiver to receive, from an access and mobility management function (AMF) node, a PDU session establishment request message from a user equipment (UE). The PDU session establishment request message may include information indicating a multi-access (MA) PDU session including first access and second access. The processor may generate an MA PDU session through any one of the first access and the second access or through both thereof based on the information indicating the MA PDU session. The processor may control the transceiver to transmit a PDU session establishment acceptance message.

According to the disclosure of the present disclosure, the problem of the conventional technology described above may be solved.

DESCRIPTION OF EXEMPLARY EMBODIMENTS

Figure 1:
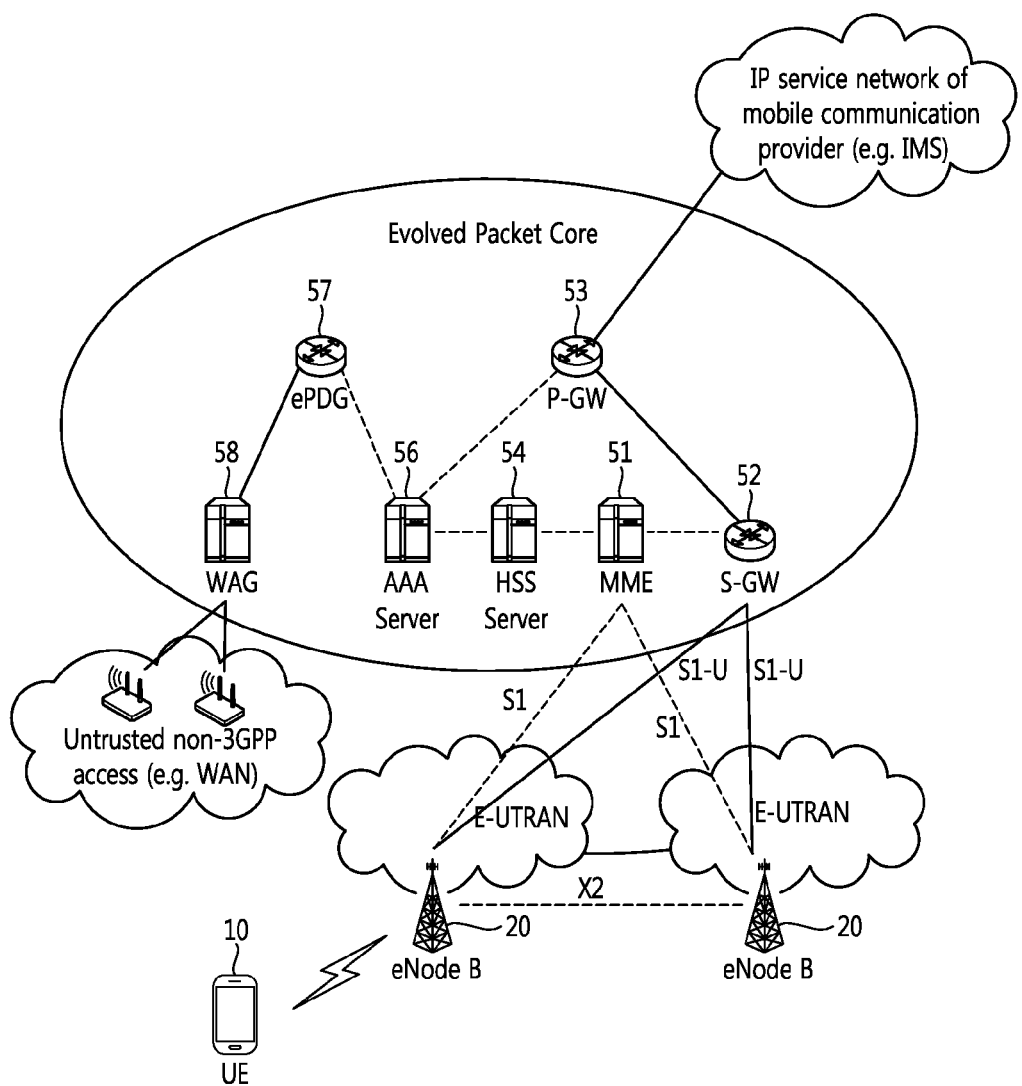
FIG. 1 shows the configuration of an evolved mobile communication network.
Figure 2:
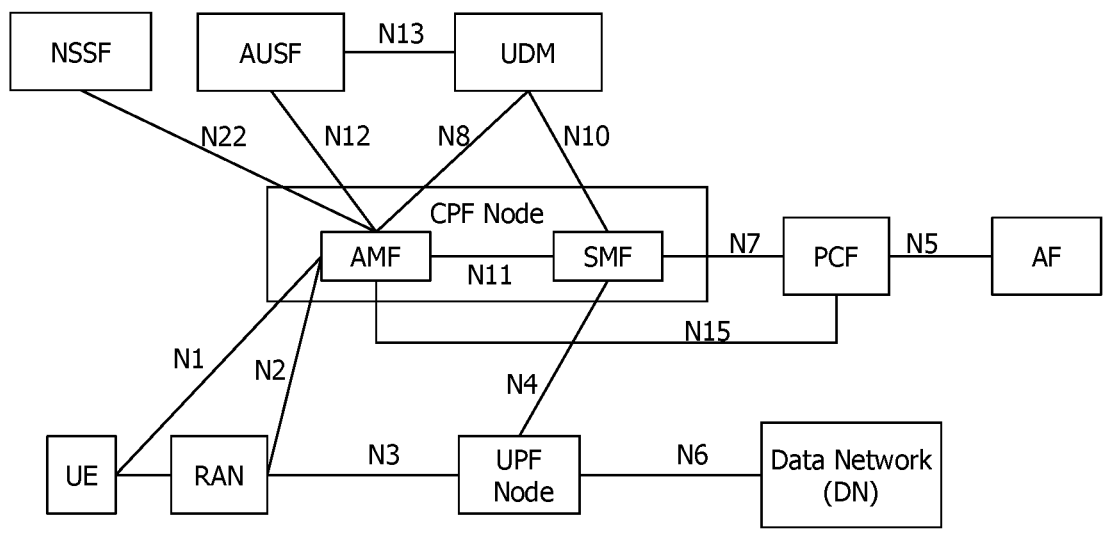
FIG. 2 shows an example of an expected structure of next-generation mobile communication from a node perspective.
Figure 3:
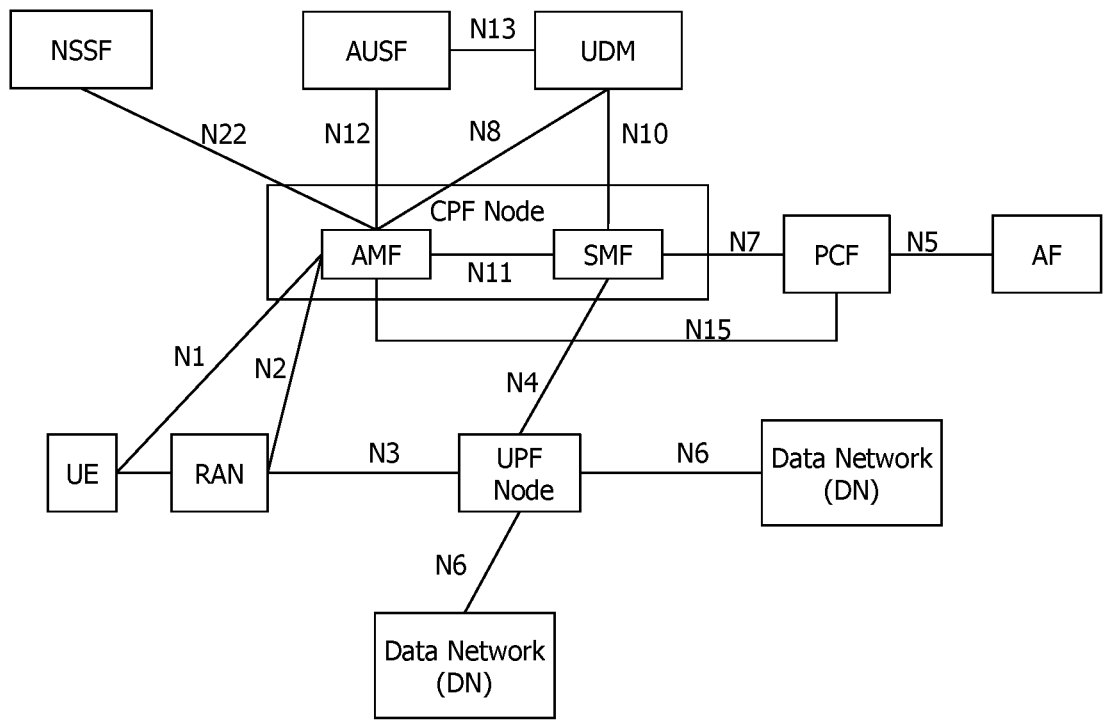
FIG. 3 shows an example of an architecture for supporting simultaneous access to two data networks.
Figure 4A:
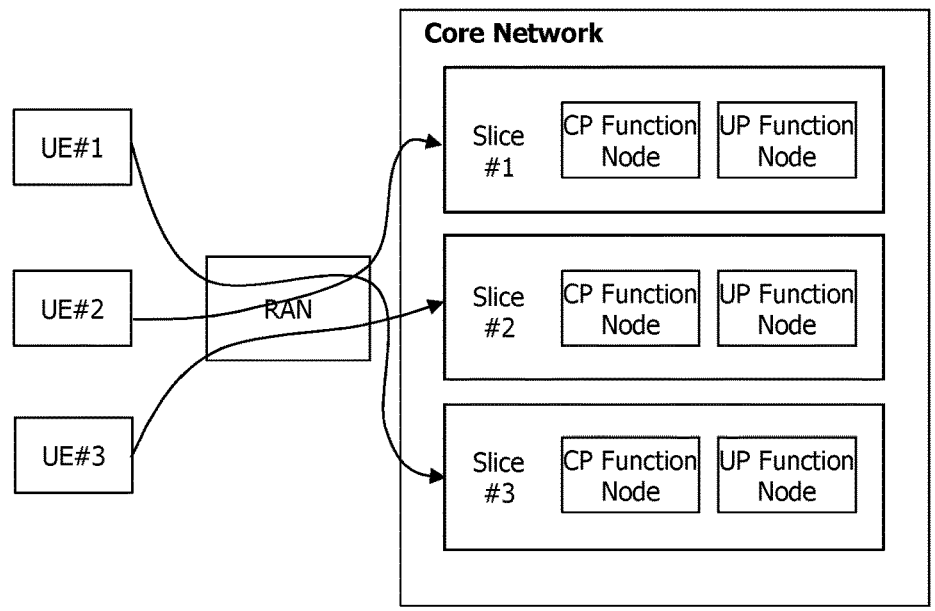
FIG. 4A is an exemplary diagram illustrating an example of an architecture for implementing the concept of network slicing.
Figure 4B:
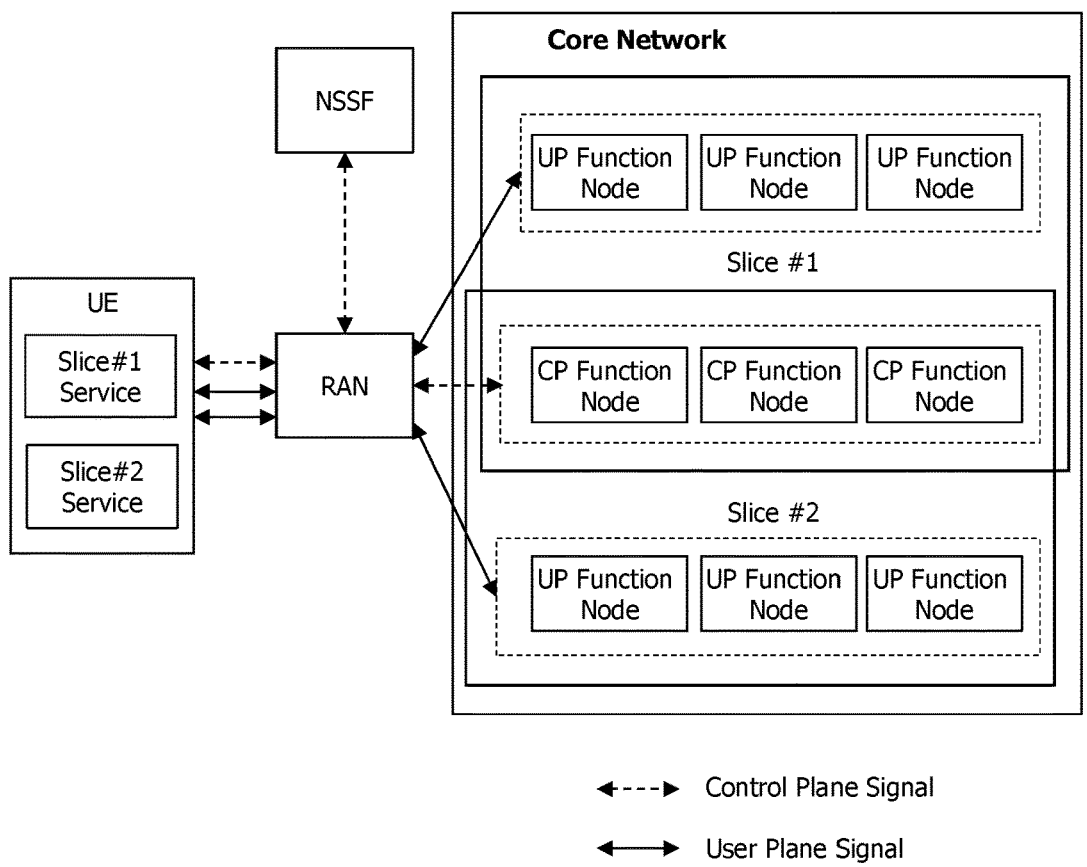
FIG. 4B is an exemplary view showing another example of an architecture for implementing the concept of network slicing.
Figure 5A:
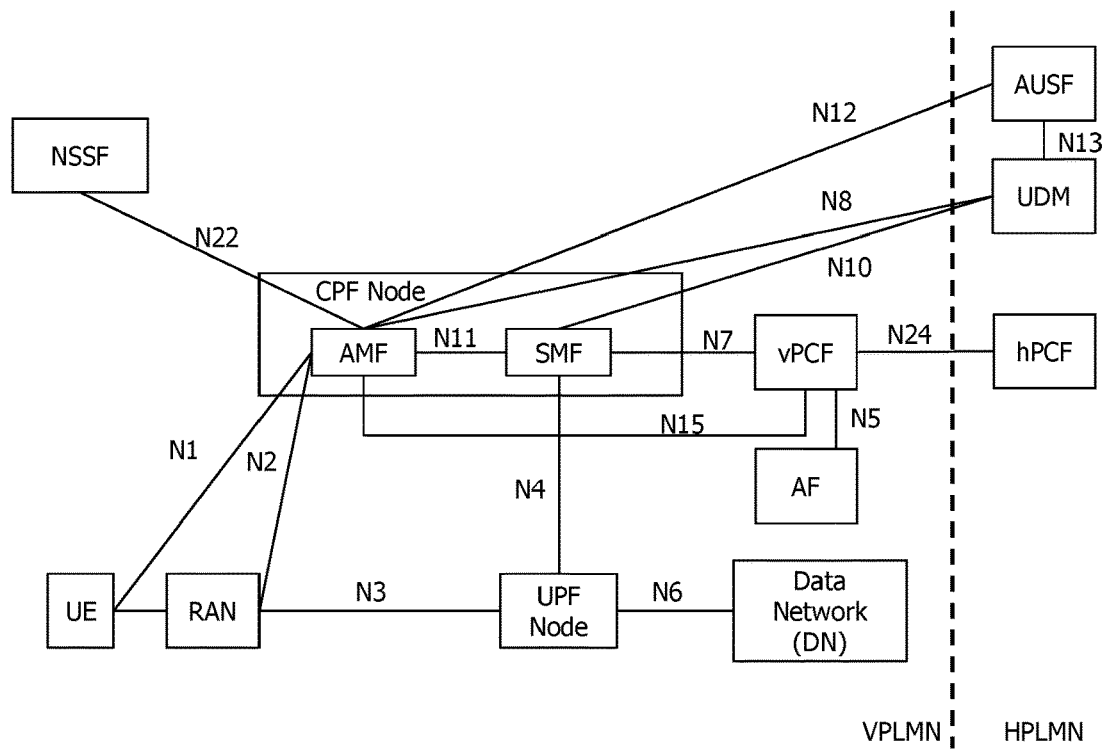
FIG. 5A is a diagram illustrating an example of architecture to which a local breakout (LBO) method is applied during roaming.
Figure 5B:
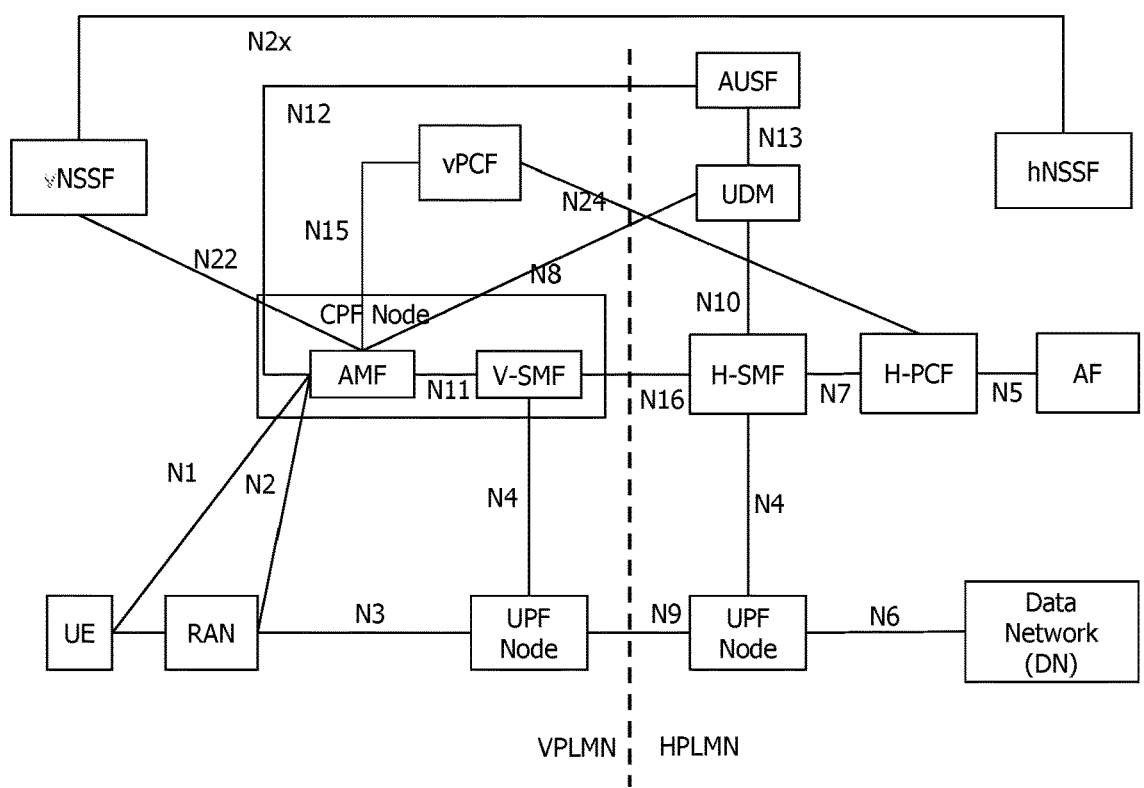
FIG. 5B is a diagram illustrating an example of architecture to which a home routed (HR) method is applied during roaming.
Figure 6A:
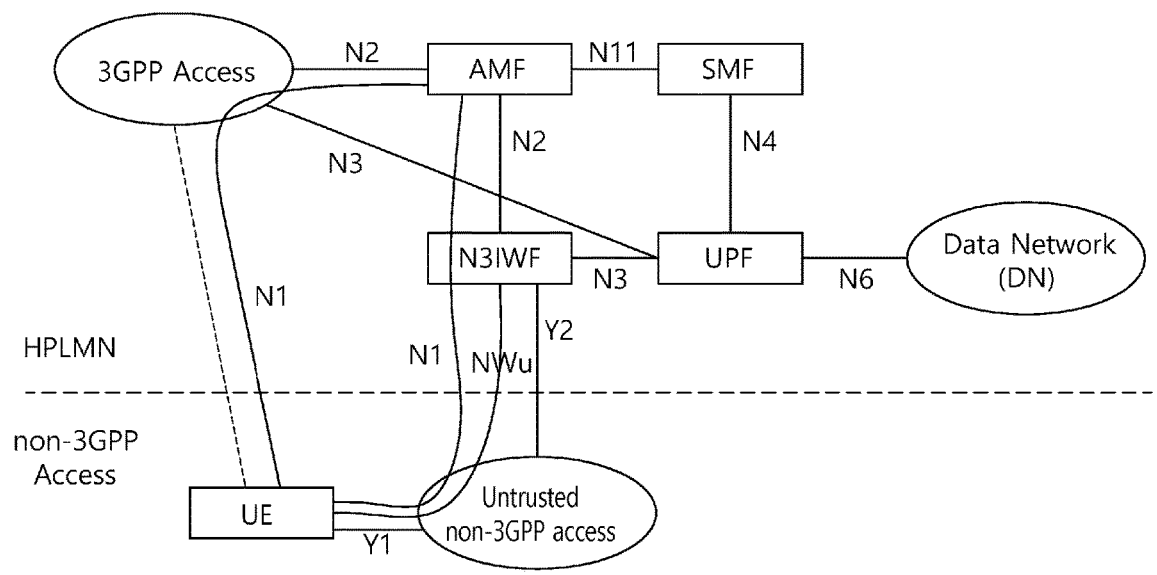
FIGS. 6A to 6F illustrate architectures for offloading data to a non-3GPP network.
Figure 6B:
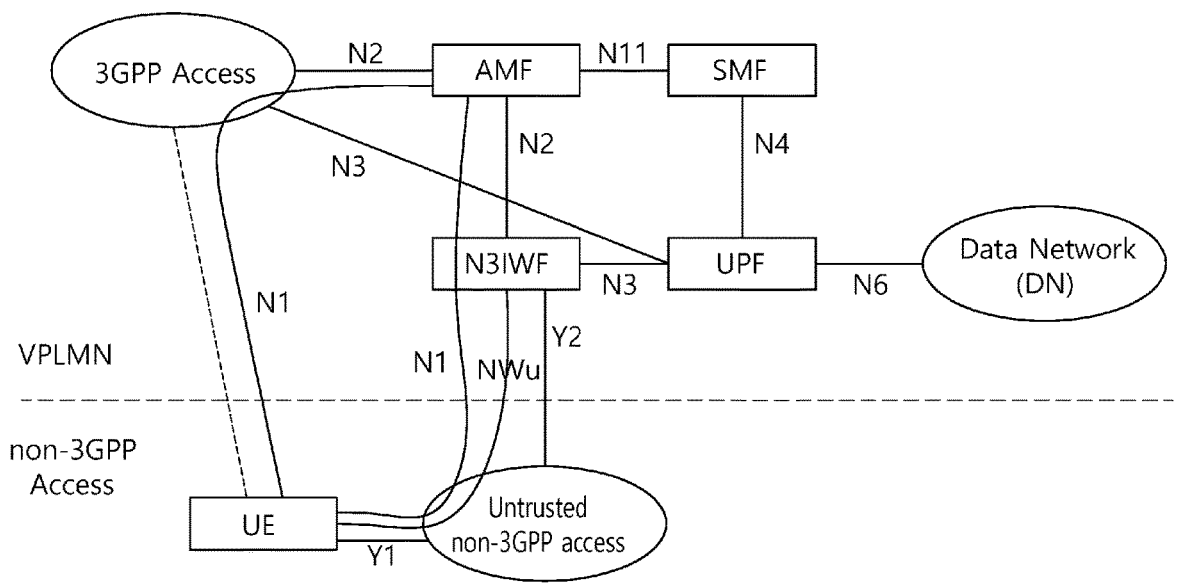
Figure 6C:
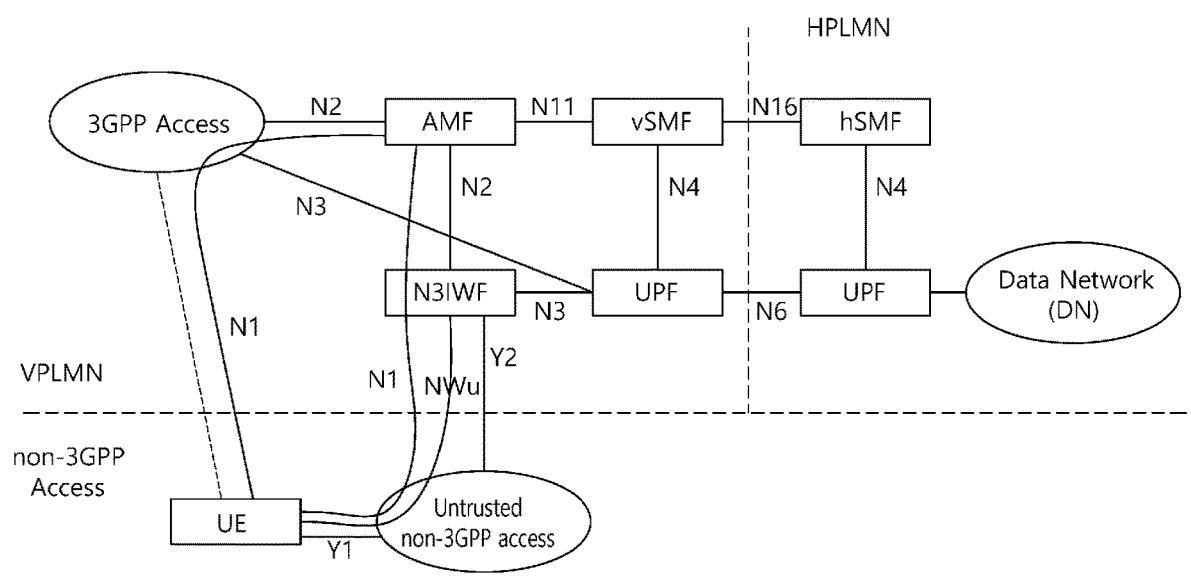
Figure 6D:
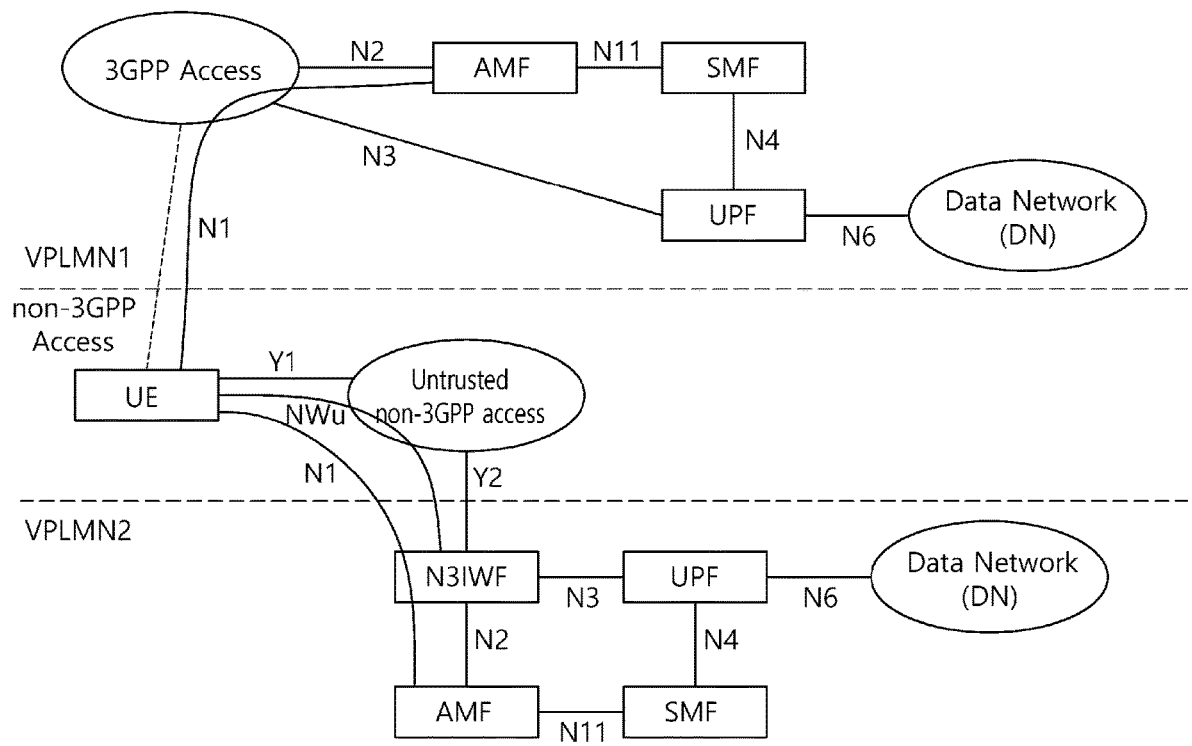
Figure 6E:
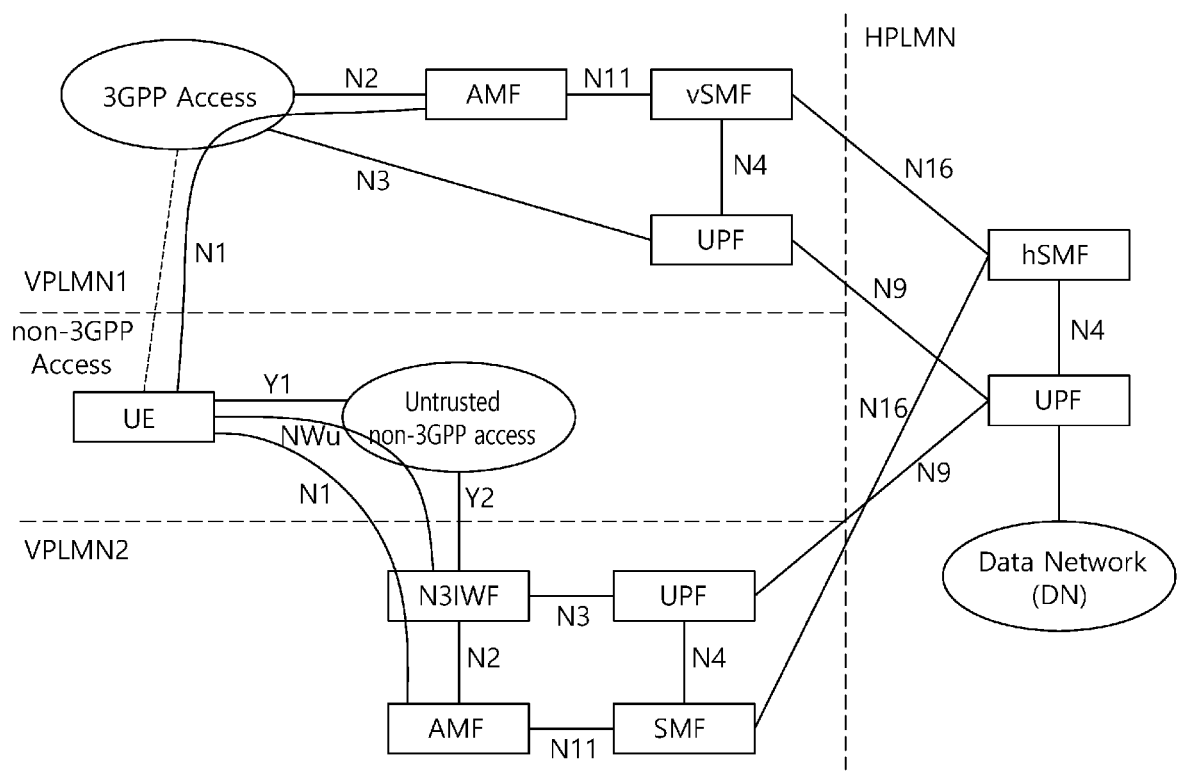
Figure 6F:
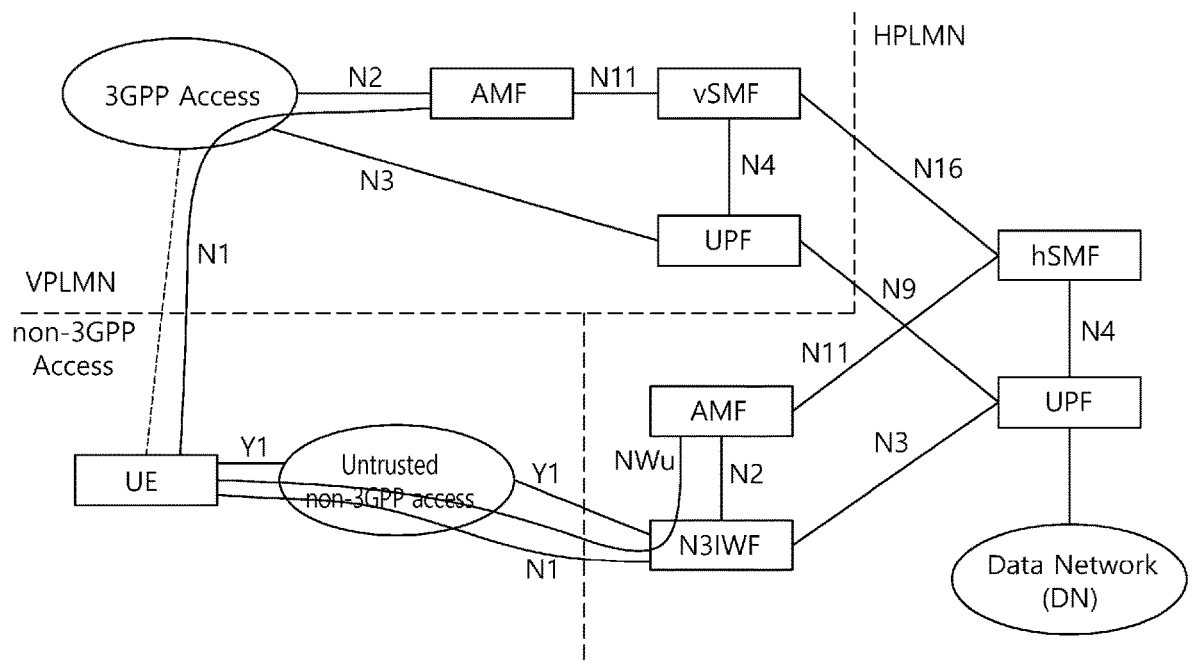

The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the spirit of the disclosure, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present disclosure.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same components throughout the drawings, and repetitive description on the same components will be omitted. Detailed description on well-known arts which are determined to make the gist of the disclosure unclear will be omitted. The accompanying drawings are provided to merely make the spirit of the disclosure readily understood, but not should be intended to be limiting of the disclosure. It should be understood that the spirit of the disclosure may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Definition of Terms

For a better understanding, the terms used herein are briefly defined before going to the detailed description of the disclosure with reference to the accompanying drawings.

UE/MS is an abbreviation of User Equipment/Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN connection refers to a connection from UE to a PDN, that is, an association (or connection) between UE represented by an IP address and a PDN represented by an APN.

A Serving gateway (Serving GW) is a network node of an EPS network which performs functions, such as mobility anchor, packet routing, idle mode packet buffering, and triggering an MME to page UE.

An eNodeB is an eNodeB of an Evolved Packet System (EPS) and is installed outdoors. The cell coverage of the eNodeB corresponds to a macro cell.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

An Access Point Name (APN) is the name of an access point that is managed in a network and provides to UE. That is, an APN is a character string that denotes or identifies a PDN. Requested service or a network (PDN) is accessed via P-GW. An APN is a name (a character string, e.g., 'internet.mnc012.mcc345.gprs') previously defined within a network so that the P-GW can be searched for.

A PDN connection is a connection from UE to a PDN, that is, an association (or connection) between UE represented by an IP address and a PDN represented by an APN. It means a connection between entities (i.e., UE-PDN GW) within a core network so that a session can be formed.

UE context is information about the situation of UE which is used to manage the UE in a network, that is, situation information including an UE ID, mobility (e.g., a current location), and the attributes of a session (e.g., QoS and priority)

NAS (Non-Access-Stratum): A higher stratum of a control plane between a UE and an MME. The NAS supports mobility management, session management, IP address management, etc., between the UE and the network.

PLMN: as an abbreviation of Public Land Mobile Network, means a network identification number of a mobile communication provider. In roaming case of the UE, the PLMN is classified into a home PLMN (HPLMN) and a visited PLMN (VPLMN).

DNN: as an abbreviation of a data network name, means an access point for management in a network, similarly to an APN, and is provided to a UE. In the 5G system, the DNN is used equivalently as the APN.

NSSP (Network Slice Selection Policy): used by a UE for mapping an application and Session Network Slice Selection Assistance Information (S-NSSAI)

<Session and Service Continuity>

A new mobile communication network provides various modes to support session and service continuity (SSC).

1) SSC Mode 1

In a protocol data unit (PDU) session establishing process, a UPF operating as a PDU session anchor is maintained regardless of an access technology (that is, an access type and a cell). In the case of an IP-type PDU session, IP continuity is maintained regardless of movement of a UE. SSC Mode 1 may be applied to any PDU session type and also applied to any access type.

2) SSC Mode 2

If a PDU session has a single PDU session anchor, a network may trigger release of the PDU session and instruct a UE to establish the same PDU session. In the new PDU session establishing process, a UE operating as the PDU session anchor may be newly selected. SSC Mode 2 may be applied to any PDU session type and also applied to any access type.

3) SSC Mode 3

In regard to a PDU session for SSC Mode 3, before releasing connectivity between a UE and a previous PDU session anchor, a network may allow connectivity establishment of a UE using a new PDU session with respect to the same data network. If a trigger condition is applied, the network may determine whether to select an appropriate PDU session anchor for the new condition, that is, a UPF. SSC Mode 3 may be applied to any PDU session type and also applied to any access type.

4) SSC Mode Selection

In order to determine a type of SSC mode regarding an application of a UE or an application group of the UE, an SSC mode selection policy may be used.

An operator may provide the UE with the SSC mode selection policy. The policy may include one or more SSC mode selection policy rules.

Figure 7:
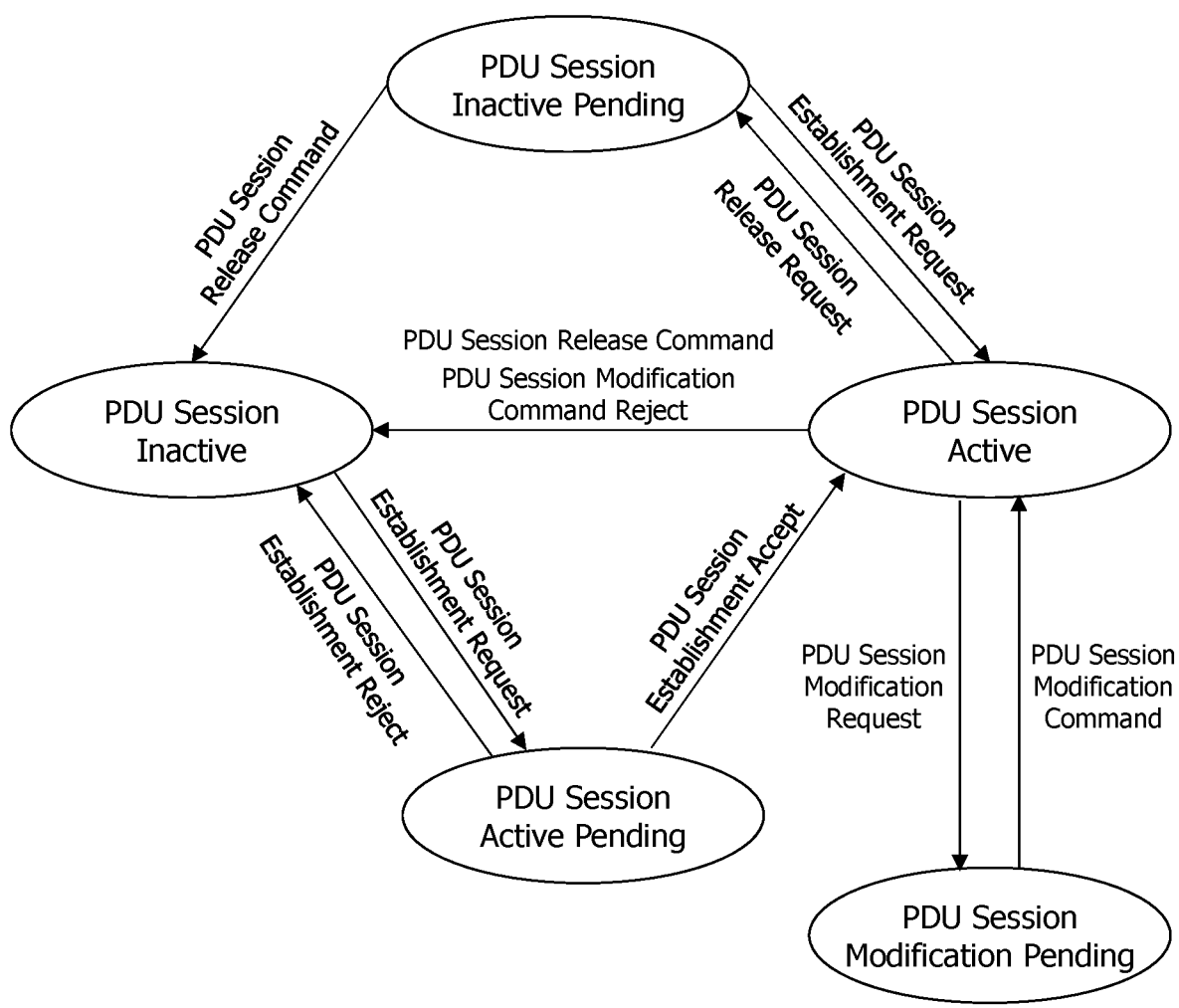
FIG. 7 illustrates the state of a PDU session.

FIG. 7 illustrates the state of a PDU session.

FIG. 7 shows a PDU session active state, a PDU session inactive state, a PUD session inactivation pending state, a PDU session activation pending state, and a PDU session modification pending state.

The PDU session inactive state refers to a state in which no PDU session context exists.

The PDU session activation pending state refers to a state in which a UE is waiting for a response from a network after initiating a PDU session establishment procedure to the network.

The PDU session active state refers to a state in which PDU session context is active in a UE.

The PDU session inactivation pending state refers to a state in which a UE is waiting for a response from a network after initiating a PDU session release procedure.

The PDU session modification pending state refers to a state in which a UE is waiting for a response from a network after initiating a PDU session modification procedure.

<Multi-Access (MA) PDU Session>

In a conventional art, an MA PDU session may be generated by bundling two separate PDU sessions established over different accesses.

Figure 8:
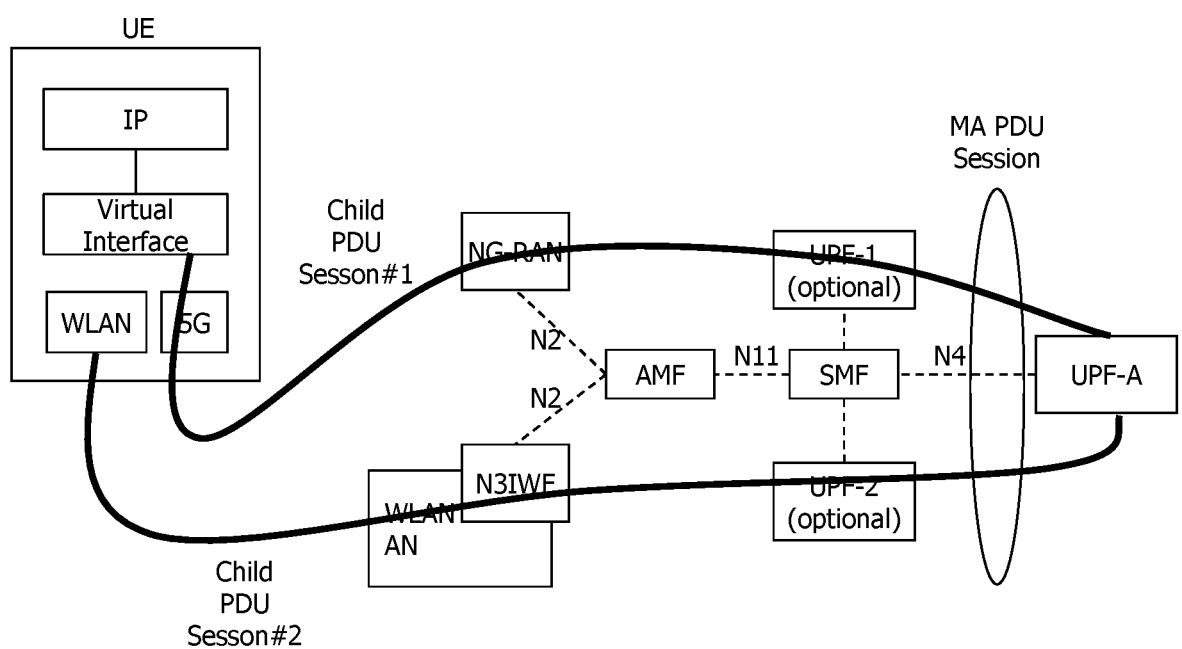
FIG. 8 shows an example in which an MA PDU session is generated according to a conventional art.

FIG. 8 shows an example in which an MA PDU session is generated according to a conventional art.

An MA PDU session includes at least two PDU sessions, referred to as child PDU sessions as shown in FIG. 8. One of the two PDU sessions is established over 3GPP access, and the other PDU session is established over untrusted non-3GPP access (e.g., WLAN AN).

The child PDU sessions of the MA PDU session may share the following characteristics:

(i) a common DNN;
(ii) a common UPF anchor (UPF-A);
(iii) a common PDU type (e.g., IPv6);
(iv) common IP addresses;
(v) a common SSC mode; and
(vi) a common S-NSSAI.

The MA PDU session enables a multi-path data link between a UE and an UPF-A. The MA PDU session may operate below an IP layer.

The MA PDU session may be established through one of the following procedures.

(i) The MA PDU may be established with two separate PDU session establishment procedures. This is called separate establishment.

(ii) The MA PDU may be established with a single MA PDU session establishment procedure. That is, two child PDU sessions are established in parallel. This is called combined establishment.

The child PDU sessions may have the same IP address.

After the MA PDU session is established, Session Management (SM) signaling related to the MA PDU session may be transmitted and received through random access.

A. Separate Establishment of MA PDU Session

The two child PDU sessions may be established through two separate PDU session establishment procedures. For example, the UE may establish a first PDU session over 3GPP access and may then establish a second PDU session over non-3GPP access. The two PDU sessions may be linked to each other and may become child PDU sessions of an MA PDU session.

A linked PDU session may be provided to a 5G Core Network (5GC). The 5GC links the second PDU session with the linked PDU session and designates the two PDU sessions as child PDU sessions of an MA PDU session.

Since the linked PDU session is provided to the 5GC, the UE does not need to request specific values for a DNN, an S-NSSAI, an SSC mode, a PDU type, and the like. The second PDU session may inherit all these values from the linked PDU session.

A request type in an establishment request message for establishment of the second PDU session may be set to "initial request". When the 5GC receives a PDU session establishment request message with the "linked" PDU session and with request type="initial request", the 5GC interprets the message as a request for establishing an MA PDU session and links the requested PDU session to the existing "linked" PDU session. Alternatively, when "initial request" is not appropriate as the request type, a new Request Type may be specified.

B. Combined Establishment

The two child PDU sessions may be established in parallel through a single procedure. This single procedure may be referred to as a UE-requested MA PDU session establishment procedure. This procedure may be useful when the UE intends to establish an MA PDU session while already registered in the 5GC via both accesses. Instead of initiating two separate PDU session establishment procedures, the UE may initiate one MA PDU establishment procedure, thereby establishing two child PDU sessions.

Figure 9:
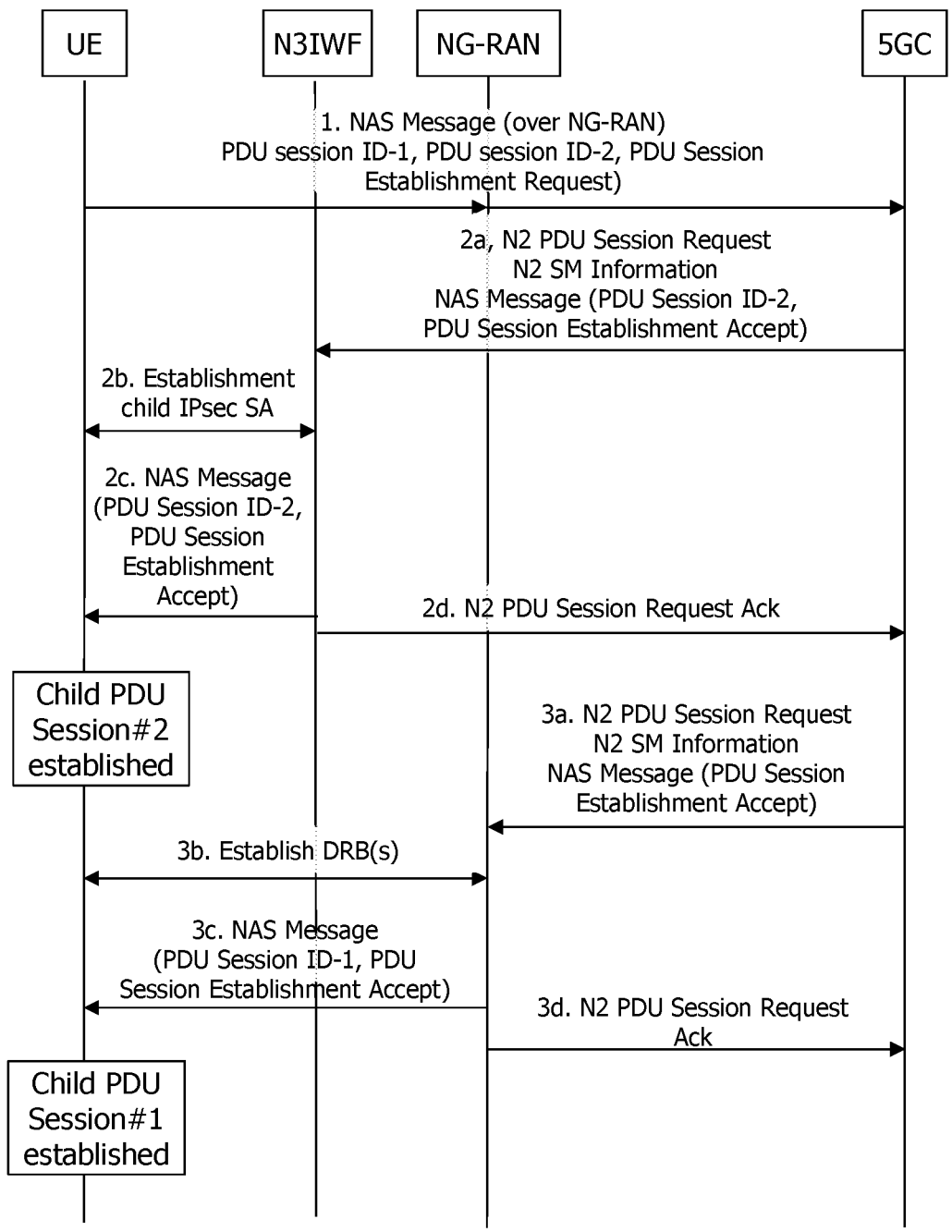
FIG. 9 illustrates a procedure for combined establishment of an MA PDU session according to a conventional art.

FIG. 9 shows an example of a procedure for combined establishment of an MA PDU session according to a conventional art.

The combined establishment procedure illustrated in FIG. 9 shows a UE-requested MA PDU session establishment procedure. Two child PDU session establishment procedures have different PDU session IDs. In the example shown in FIG. 9, a child PDU session over 3GPP access is indicated by PDU session ID-1, and a child PDU session over non-3GPP access is indicated by PDU session ID-2. An SMF of a 5GC triggers two N2 PDU session establishment procedures. A UE may receive a PDU session establishment acceptance message for PDU session ID-1 over 3GPP access and may receive a PDU session establishment acceptance message for PDU session ID-2 over non-3GPP access. The SMF may anchor both PDU sessions to the same UPF and may allocate the same IP address to both PDU sessions.

Problems to be Solved Through Disclosures of Specification

The foregoing combined MA PDU session establishment procedure is a method of bundling PDU sessions over different accesses into an MA PDU session and managing the MA PDU session. To this end, a UE and a network need to separately manage context for a PDU session over each access and context for managing the two PDU sessions together, thus complicating maintenance of the sessions. It is assumed that the UE is registered over 3GPP access and non-3GPP access. However, when one access is unavailable as soon as a combined MA PDU session is established, a method for handling this case has not been studied so far. Further, when one access is unavailable during use of an MA PDU session, a method for managing the MA PDU session has not been studied so far.

Disclosures of Specification

Accordingly, an aspect of disclosures of this specification is to provide methods for an SMF to efficiently manage an MA PDU session.

I. First Disclosure

In this specification, an MA PDU session is a PDU session generated with one PDU session stretching across both 3GPP access and non-3GPP access. Accordingly, a UE can use 3GPP access and non-3GPP access in parallel with only one PDU session.

According to selective activation/inactivation criteria for a PDU session, a PDU session may be referred to as being active when user-plane (UP) resources are allocated, and may be referred to as being inactive when there is no user-plane (UP) resource. However, in the case of an MA PDU session generated over both 3GPP access and non-3GPP access, when a user-plane resource in either access is not allocated, the MA PDU may be defined as being in a new state or as being in an active state. In this section, when there is no user-plane resource only in either access, the MA PDU session is defined as being in a new state, for example, a partially active state.

Figure 10:
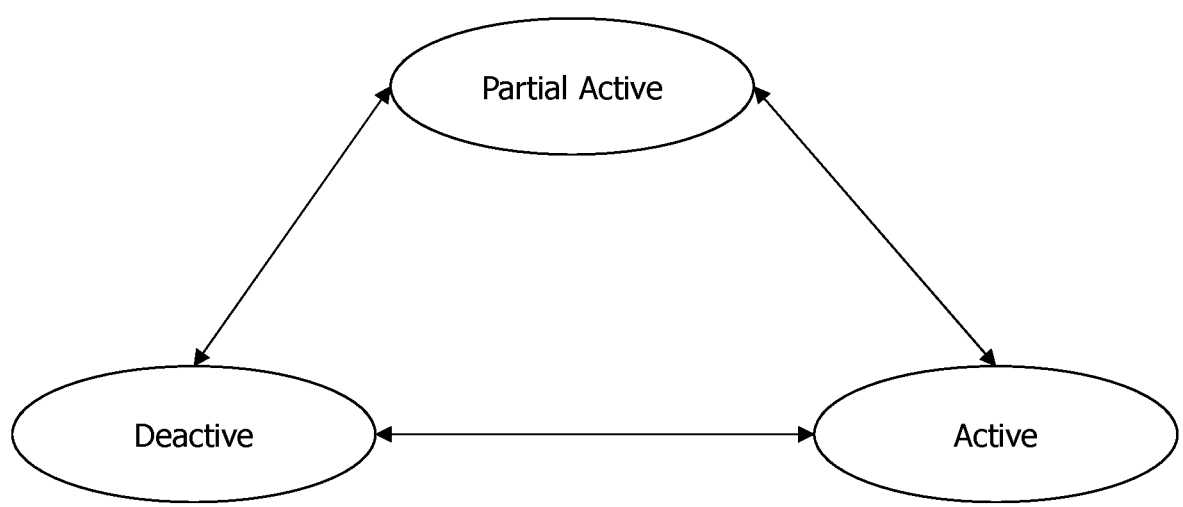
FIG. 10 illustrates states for managing an MA PDU session.

FIG. 10 illustrates states for managing an MA PDU session.

As illustrated in FIG. 10, an MA PDU session may be in any one of three states, which are an active state, an active state, and a partially active state. The MA PDU session may have these states in all of a UE, an SMF, and a PCF.

In the partially active state, access in which a user plane (UP) is generated (or in which a UP has been generated or which corresponds to an RM-REGISTERED state)=enabled and access in which a UP is not generated (or in which a UP has not been generated or which corresponds to an RM-DEREGISTERED state)=disabled may be additionally stored.

Alternatively, when a UP is generated (or a UP has been generated) for at least one access, the MA PPD session may be considered active, and information about enabled access and disabled access may be additionally stored.

Figure 11:
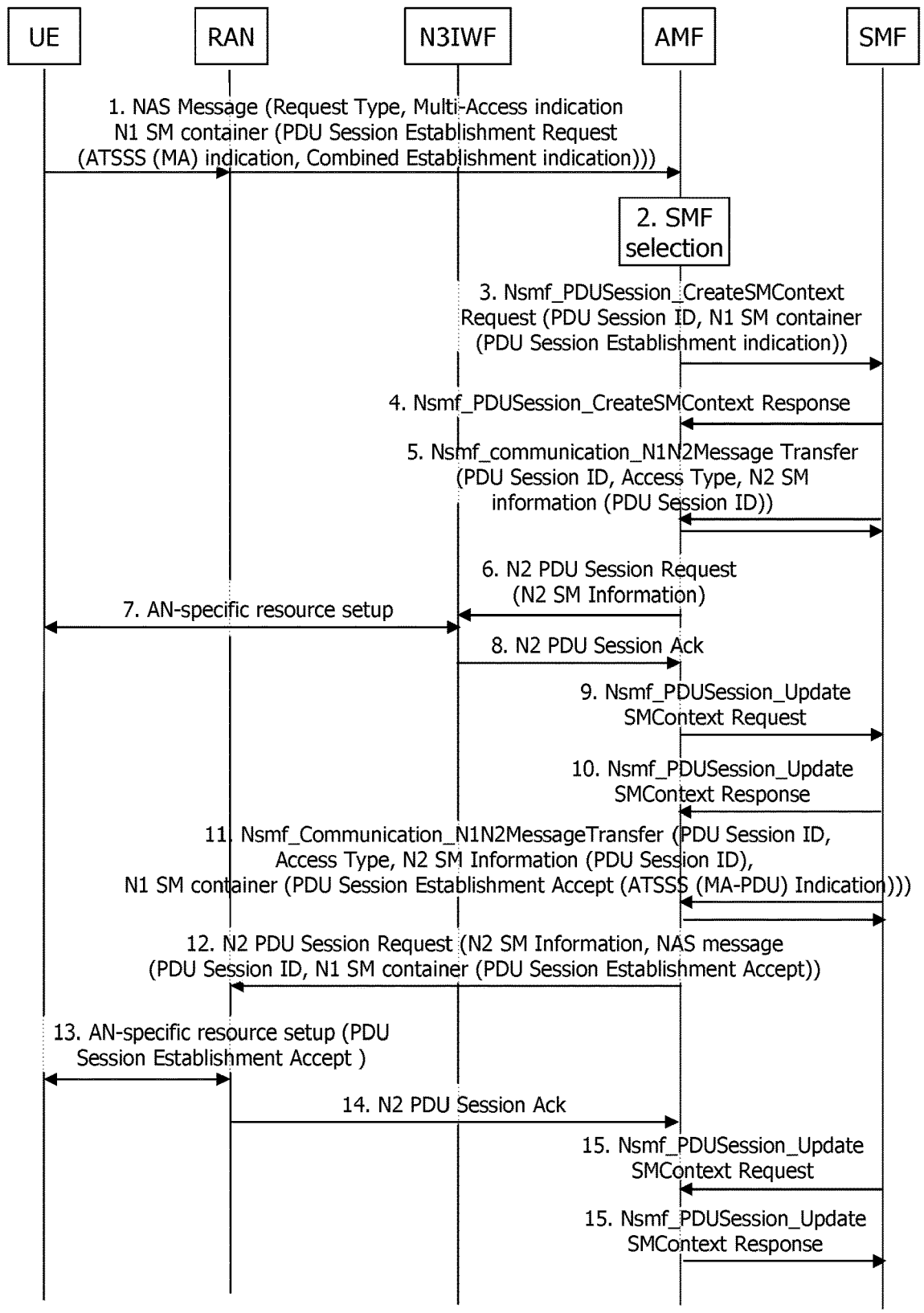
FIG. 11 is a flowchart illustrating an improved procedure for combined establishment of an MA PDU session according to a disclosure of the present specification.

FIG. 11 is a flowchart illustrating an improved procedure for combined establishment of an MA PDU session according to a disclosure of the present specification.

First, a UE assumes that both 3GPP access and non-3GPP access are registered in the same PLMN.

1) To perform a combined establishment procedure, the UE may transmit a PDU session establishment request message including an Access Traffic Steering, Switching and Splitting (ATSSS) indication/information (and/or MA indication) and a combined session establishment request indication. The MA indication is also included in an NAS message including the PDU session establishment request message, thereby notifying an AMF of a request for an MA PDU session.

2) The AMF generates context of the PDU session based on the MA indication of the MM NAS message transmitted by the UE and stores an access type as all accesses or MA. When selecting an SMF, the AMF selects an SMF supporting an MA PDU session based on the MA indication transmitted by the UE.

3-4) The AMF transmits the PDU session establishment request message to the SMF and also forwards information about whether the UE is registered via both 3GPP access/non-3GPP access. The information may indicate that the UE is registered via both accesses or may indicate that the UE is registered via only one access (via which access the UE is registered). The information may be either explicitly or implicitly forwarded to the SMF. Here, since access signaled by the UE is access to which the UE has already connected, the AMF may forward only information about the other access. In addition, the AMF may notify the SMF of not only a registered state but also an idle/connected state. When the UE is registered via non-3GPP access but is in the idle state, user plane setup cannot be performed, in which case the SMF does not transmit a UP resource setup request for non-3GPP.

The AMF may also transmit allowed NSSAI for each access to the SMF. Alternatively, the AMF may forward, to the SMF, information about whether S-NSSAI forwarded by the UE along with the PDU session establishment request is included in allowed NSSAI for both accesses. The SMF may accept the MA PDU establishment request only when the allowed NSSAI for both accesses includes the S-NSSAI forwarded by the UE based on the information. Alternatively, the AMF may directly determine to reject the request from the UE only when the S-NSSAI forwarded by the UE is not included in the allowed NSSAI for both accesses. In a case where the UE has been registered via only one access, when the UE is registered through the other access, the AMF identifies whether the S-NSSAI of the MA PDU session is included in allowed NSSAI for the other access. When the S-NSSAI of the MA PDU session is not included in the allowed NSSAI for the other access, the AMF may request the SMF to release the MA PDU session. In this case, the AMF may forward a cause value or indication indicating that the allowed NSSAI is not allowed for both accesses. Upon receiving the cause value or indication, the SMF may perform a procedure for releasing the MA PDU session or changing the MA PDU session to a normal PDU session (single-access PDU session) used only via access for which the S-NSSAI is allowed. When changing the MA PDU session to a normal PDU session, the SMF may perform a PDU session modification or PDU session release procedure. Regardless of the procedure to be performed, the SMF transmits, to the UE, a PDU session modification command/PDU session release command message including a cause value or indication indicating that the MA PDU session has been changed to the normal PDU session and indicates access over which the PDU session is allocated to the UE. Here, the SMF may indicate to the AMF that the MA PDU session has been changed to the normal PDU session using a Namf_PDU session_SMContextStatusNotify service or a different service. Further, the SMF may forward an access type indicating access through which the PDU session is generated. Upon receiving the access type, the AMF may update the access type of the MA PDU session based on both of the two accesses or the access type (3GPP access or non-3GPP access) indicated by the SMF. This operation may be performed for different reasons, e.g., when the UE has been registered over one access to generate an MA PDU session but is registered through a different PLMN over the other access, when S-NSSAI of an MA PDU session has been included in the allowed NSSAI for both accesses but S-NSSAI of the MA PDU session over one access is excluded from the allowed NSSAI due to mobility of the UE, when subscription information of the UE is updated (which is triggered by the SMF), or when a policy is updated by an operator or PCF and thus does not allow the MA PDU session any more.

5-10) The SMF performs combined session establishment based on the MA indication and the combined session establishment indication transmitted by the UE. The SMF performs a combined session establishment procedure only when the UE is registered over both accesses according to the information transmitted by the AMF. First, the SMF transmits an N2 SM message over access (e.g., 3GPP access) signaled by the UE and the other access (e.g., non-3GPP access), thereby allocating a user-plane resource (i.e., N3 resource). Here, the SMF may determine, based on the operator's policy, whether to first transmit the N2 SM message over one access or to simultaneously transmit the N2 SM message over both accesses in order to perform the procedure for allocating the user-plane resource. Generally, a PDU session acceptance message transmitted to the UE includes a QoS rule, and assuming that the QoS rule is available for both accesses, it is desirable to transmit the QoS rule to the UE after a QoS is set up for both accesses. Further, since transmissions of the N2 SM message and an NAS PDU session acceptance message are generally performed together by one N1N2MessageTransfer, a user plane may be set up over the opposite access and a QoS rule may be determined based on the user plane actually set up. In addition, when allocating user-plane resources over both accesses in parallel, the UE cannot identify access over which a user-plane resource is being allocated after receiving the PDU session establishment acceptance message and may thus autonomously perform a subsequent operation for allocating a user-plane resource (e.g., a PDU session establishment request or service request). In this case, the UE may transmit an unnecessary signal even though a user-plane resource allocation procedure is in progress in a network. To prevent this situation, the SMF may indicate access (e.g., both accesses, only 3GPP access, or only non-3GPP access) over which a user-plane resource is successfully allocated through an indication in the PDU session establishment acceptance message. Here, when a user-plane resource is allocated over only one access, the SMF may indicate the reason why the user-plane resource is allocated over only one access to the UE through a cause value or the like. For example, a user-plane resource may not be allocated because there is congestion in one access or when an MM procedure, such as a registration/service request, is in progress. Accordingly, the SMF first needs to perform a user-plane resource allocation procedure over access other than access for which the UE transmits a request message. The UE may determine when to request user-plane resource allocation over the other access based on the indication and the cause value received through the acceptance message.

Alternatively, even though the UE is registered over only one access, the SMF may perform a combined session establishment procedure. In this case, the SMF transmits the N2 SM message only over the access over which the UE is registered, thereby allocating a user-plane resource.

11-16) After the user-plane resource is successfully set up according to the foregoing processes 5-10, the SMF performs a process for allocating a user-plane resource through the access signaled by the UE. Here, the SMF also indicates to the UE that the MA PDU session has been successfully generated.

When the SMF fails to generate the user-plane resource over the access according to the foregoing processes 5-10 or when the UE is not registered over one access and thus the SMF does not attempt to generate a user-plane resource over access, the SMF manages the state of the MA PDU session as illustrated in FIG. 10. Further, in this case, the SMF indicates that the MA PDU session is successfully generated by transmitting a PDU session establishment acceptance message to the UE and indicates the access over which the user-plane resource is completely allocated (or indicates access over which no user-plane resource is allocated). Upon receiving the PDU session establishment acceptance message, the UE manages the state of the MA PDU session as illustrated in FIG. 10. When the UE is not registered over access over which no user-plane resource is allocated, the PDU session establishment acceptance message may enable the UE to recognize that the UE is not registered over the access over which no user-plane resource is allocated through separate or implicit information. When receiving a request for an MA PDU session, the SMF may transmit a PDU session acceptance message to the UE without any additional indication or cause value when accepting the request. In this case, when receiving no separate indication from the SMF and receiving an indication that a user plane is set up for the PDU session over both accesses from a lower layer (e.g., it is recognized that an AS layer has been generated in 3GPP access and a default IPsec tunnel has been generated in non-3GPP access), the UE may recognize that the request for the MA PDU session has been successful. Further, when recognizing that a user plane has been set up over only one access, the UE manages the state of the MA PDU session as illustrated in FIG. 10. When the SMF receives a request for an MA PDU session but allows the MA PDU session only as a normal PDU session (i.e., handles the request as a PDU session request for specific access), the SMF may transmit a PDU session acceptance message and may indicate that the MA PDU session is a normal PDU session rather than an MA PDU session through a cause value or indication. Alternatively, the SMF may transmit an indication only when the MA PDU session is allowed, and may not include an indication when the MA PDU session is allowed as a normal PDU session, thereby indicating the usage of the generated PDU session. When the MA PDU session is accepted as a normal PDU session, the SMF may also indicate access over which the PDU session has been generated. When there is no separate access information, the UE may recognize that a normal PDU session has been generated through access over which the acceptance message has been received.

When it is determined that the UE is registered over both accesses, a user-plane resource cannot be allocated over specific access for the following reasons.

When the UE is in a CM-IDLE state over non-3GPP access and thus it is impossible to allocate a user-plane resource (in most cases, a UE in the CM-IDLE state over non-3GPP access may be in a state of being out of the coverage of non-3GPP access. Thus, the UE is not reachable, and accordingly it is impossible to allocate a user-plane resource).

When the UE considers that the UE is registered over both accesses but a network has implicitly deregistered one random access When one access has congestion or insufficient radio resources and thus it is impossible to allocate a user-plane resource When an MM procedure, such as registration/service request, is in progress over one access The SMF may perform a session management policy establishment procedure with the PCF. Here, the SMF may provide information indicating that the generated PDU session is an MA PDU session and state information about the PDU session (the states illustrated in FIG. 10 and/or the enabled/disabled state of each access) to the PCF. When the PCF performs an operation of generating a traffic steering rule for the MA PDU session, the PCF may configure the traffic steering rule such that traffic is not routed over disabled access or disabled access has a lower priority than enabled access when selected as access over which traffic is routed. When the UE performs an operation of generating a traffic steering rule for the MA PDU session, the UE may configure the traffic steering rule such that traffic is not routed over disabled access or disabled access has a lower priority than enabled access when selected as access over which traffic is routed.

Similarly, when specific access is disabled with the traffic steering rule transmitted to a UPF, the SMF may transmit an indication or may update the traffic steering rule so as not to perform traffic steering over the access. This is because the UPF may not know access over which a user plane is set up. For example, when there is an additional UPF between an AN node and a PDU Session Anchor (PSA) UPF and there is no user plane for the access, the SMF can release only a connection between the AN node and the additional UPF. The SMF may not release a connection between the additional UPF and the PSA. In this case, the PSA performing ATSSS does not recognize whether a user plane is set up. Therefore, the SMF needs to directly indicate corresponding information to the PSA. In order to prevent such signaling, in the case of an MA PDU, the SMF may also always release the additional UPF when releasing a user plane over specific access. In this case, when the additional UPF need to be configured between the AN node and the PSA when setting up the user plane, more signaling may occur.

When a user plane is not allocated in the successfully generated MA PDU session (or in the disabled state), the UE may request user plane allocation through a registration/service request over the access. When the UE is temporarily deregistered from one access and then performs registration, the AMF may report the registration of the UE to the SMF, and the SMF may allocate a user-plane resource for the access. To this end, the SMF may request a notification service of reporting an event from the AMF when the UE is registered or is connected over access in which a user plane resource is not allocated while generating a PDU session. When the UE is registered or is connected, the AMF reports to the SMF that the UE is registered or is connected based on the notification service requested by the SMF. When the UE performs registration or performs a service request procedure, the UE may forward information indicating that the UE wants to activate the MA PDU session. Accordingly, the AMF may report to the SMF serving the PDU session that the PDU session needs to be activated over access which has been released or over which a service request has been performed. Subsequently, the SMF performs an operation of allocating a user-plane resource for the access.

When the UE performs a service request, the UE may use a list of PDU sessions to be activated in order to request activation of the MA PDU session. The AMF may request activation of the PDU session from the SMF based on the list. Generally, it is possible to activate only a PDU session for corresponding access. That is, when a service request message is transmitted through 3GPP access, it is possible to request activation of only a PDU session for 3GPP access. On the contrary, when a service request message is transmitted through non-3GPP access, it is possible to request activation of only a PDU session for non-3GPP access. However, since the MA PDU session is not a PDU session for specific access, it is possible to request activation of the PDU session regardless of access. In this case, when receiving a request for activation of a user plane from the AMF, the SMF can set up user planes for both accesses. Here, the SMF can set up a user plane only for access over which the UE is registered based on registration information from the AMF. Alternatively, the AMF may report setup of a user plane and may also report information about access for which the user plane is set up. That is, when the UE is registered over only one access, the AMF may forward access information to the access, thereby requesting setup of a user plane for the access. When the UE is registered over both accesses, the AMF may forward both accesses or multiple accesses, thereby requesting setup of user planes for both accesses. The SMF sets up a user plane only for access for which a user plane is not set up based on the information forwarded by the AMF.

When performing a registration request procedure, the UE may use the list of PDU sessions to be activated. Generally, the list of PDU sessions to be activated is included only in mobility registration or periodic registration. However, according to a disclosure of the present specification, in the case of an MA PDU session, it is possible to request activation of the PDU session through the list of PDU sessions to be activated in an initial registration procedure. For example, when successfully generating an MA PDU with registered over only 3GPP access, the UE may request PDU session activation for the MA PDU at the same time as performing initial registration over non-3GPP access. In this case, the AMF may forward the PDU session activation request for the MA PDU to the SMF only when the registration is successful.

The list of PDU sessions to be activated may be used to request allocation of a user-plane resource only for corresponding access rather than being used to request allocation of all user-plane resources for both accesses as in the above operation. In this case, the SMF allocates a user-plane resource only for access requested by the UE based on the list of PDU sessions to be activated. Separately, a new indication may be added to request allocation of all user-plane resources for both accesses. In this case, the UE determines which indication to use according to desired access for which a user-plane resource is allocated. Accordingly, when traffic needs to be transmitted over only one access, it is not necessary to allocate resources for both accesses, thus efficiently using resources (e.g., GBR QoS flow).

When the SMF successfully allocates a user-plane resource for disabled access, the disabled access is switched to the enabled state. When the state of the MA PDU session is managed as the partially active state, the state of the MA PDU session is updated to the active state. In order to indicate information about the state change to the PCF, the SMF may perform a session management policy modification operation with the PCF. When the PCF performs an operation of generating a traffic steering rule for the MA PDU session, the PCF may configure the traffic steering rule such that traffic is routed over enabled access or enabled access has a higher priority than access that was originally enabled when selected as access over which traffic is routed. The traffic steering rule may be generated for the MA PDU session such that traffic is routed over access when a user plane is activated for the access that was disabled. Alternatively, the traffic steering rule may configure a priority such that access over which traffic is routed is preferentially selected.

Similarly, when specific access is enabled with the traffic steering rule transmitted to the UPF, the SMF may transmit an indication or may update the traffic steering rule so as not to perform traffic steering over the access.

When the UE is registered over both 3GPP and non-3GPP, the UE transmits the PDU session establishment request message is transmitted through 3GPP access. Otherwise, when the UE is idle over 3GPP access, the AMF may need to transmit a paging signal to the UE in order to set up a user plane. Therefore, in order to reduce use of resources for the paging signal, the UE may transmit a PDU session establishment request over 3GPP access. When the UE is idle over 3GPP access, the UE may first perform a service request procedure and may then transmit the PDU session establishment request.

Generally, the AMF transmits a release request message to the SMF in order to release a PDU session generated through access from which deregistration needs to be performed. When deregistration from one access occurs while the MA PDU session is being used, the AMF reports to the SMF managing the MA PDU session that deregistration from the specific access has occurred. In this case, the SMF may perform one of the following operations based on an operator policy, a reason for the deregistration, and the like.

The SMF changes the MA PDU session to a normal PDU session, and releases a user-plane resource for deregistered access if the user-plane resource is allocated. In this case, the SMF reports to the AMF that the PDU session has been changed to the normal PDU session. Then, the AMF changes the access type of the PDU session to both accesses or to either 3GPP access or non-3GPP access. In addition, the SMF may also report to the PCF that the PDU session has been changed to the normal PDU session. The SMF also forwards the same information to the UE. For example, the SMF may report that the PDU session has been changed to the normal PDU session while performing a modification procedure for the PDU session. Then, the UE deletes all rules related to ATSSS. Alternatively, when the SMF deletes all rules related to ATSSS, the UE may recognize that the PDU session has been changed to the normal PDU session.

The SMF changes the state of the PDU session as shown in FIG. 10 while maintaining the MA PDU session as the MA PDU session. The SMF releases a user-plane resource for deregistered access if the user-plane resource is allocated. In addition, the SMF may also report a change in the state of the PDU session to the PCF.

When the PCF generates/updates a traffic steering rule for the MA PDU session:

i) The PCF may generate/configure the traffic steering rule such that traffic is not routed over access deregistered with respect to the PDU session which is changed to the normal PDU session or the deregistered access has a lower priority in the traffic steering rule than registered access when selected as access over which the traffic is routed.

ii) If the SMF maintains the MA PDU session as the MA PDU session, the PCF may generate/configure the traffic steering rule such that traffic is not routed over disabled access or the disabled access has a lower priority in the traffic steering rule than enabled access when selected as access over which the traffic is routed.

The UE also manages the PDU session by changing the state of the PDU session in response to the operation performed by the SMF.

When the UE performs an operation of generating a traffic steering rule for the MA PDU session, the UE may perform the above operations i) and ii) according to the changed state of the PDU session.

Figure 12:
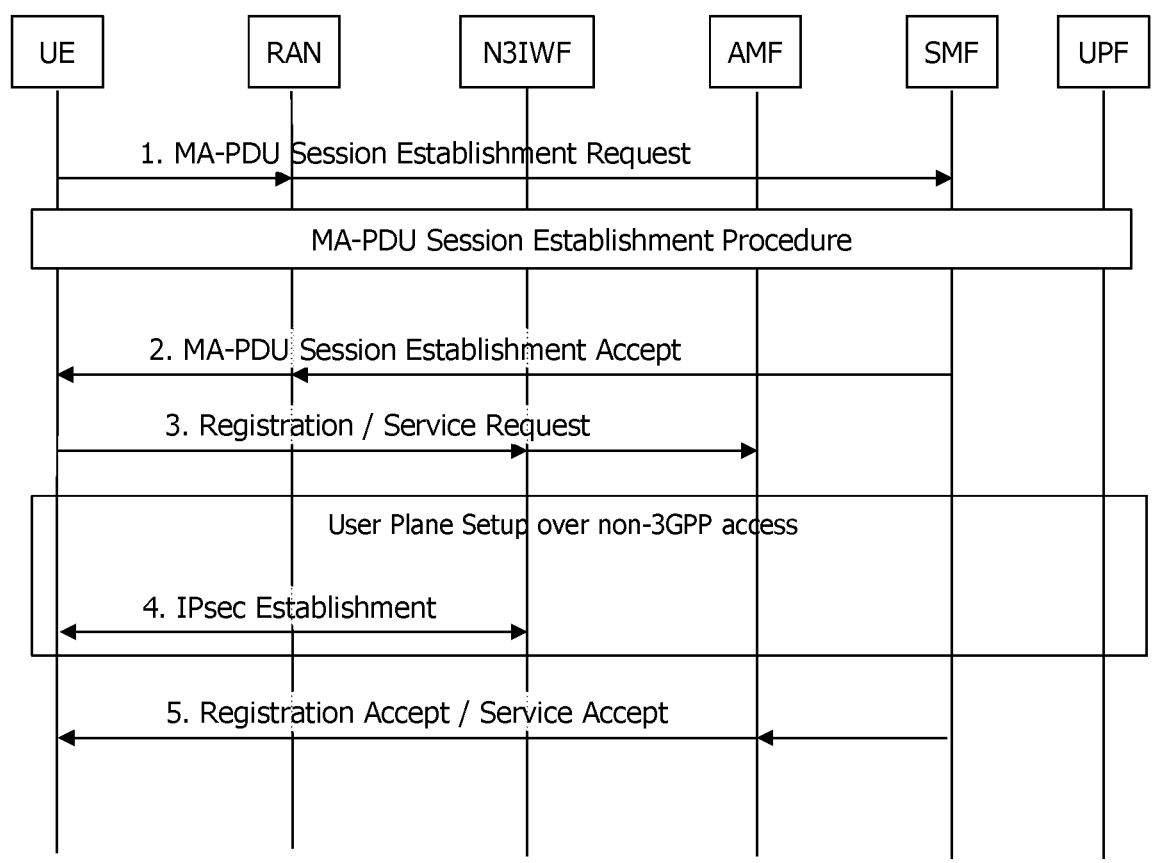
FIG. 12 illustrates a procedure in which a UE initiates setup of a user plane according to a disclosure of the present specification.

FIG. 12 illustrates a procedure in which a UE initiates setup of a user plane according to a disclosure of the present specification.

FIG. 12 shows a procedure in which a UE initiates setup of a user plane for non-3GPP access when an MA PDU session is generated in a state of being registered over only 3GPP access or being deregistered from non-3GPP access/idle over non-3GPP access.

1) The UE may transmit an MA PDU session establishment request message through 3GPP access. A specific procedure has been described with reference to FIG. 11.

2) An MA PDU session is established, and an SMF transmits an MA PDU session establishment acceptance message to the UE. Specifically, when accepting an MA PDU session establishment request, the SMF may transmit a PDU session acceptance message that does not include a separate indication or cause value to the UE. When receiving no separate indication from the SMF and receiving an indication that a user plane for the PDU session has been set up over both accesses from a lower layer (e.g., it is recognized that an AS layer has been generated in 3GPP access and a default IPsec tunnel has been generated in non-3GPP access), the UE may recognize that the request for the MA PDU session has been successful.

The UE may determine that the MA PDU session has been established but the user plane has been set up over only one access based on some or a combination of a plurality of the following conditions.

When the PDU session acceptance message includes an indication that the PDU session is generated as an MA PDU session or does not include an indication that the PDU session is generated as a PDU session for one access When the PDU session acceptance message includes an indication/information indicating that a user plane has been set up over only one access (e.g., 3GPP access or non-3GPP access)

When the AS layer of the UE receives an indication that a user plane has been set up within a certain time but the IPsec tunnel for the PDU session is not generated over non-3GPP access When the IPsec tunnel for the PDU session is generated over non-3GPP access within a certain time but the AS layer of the UE does not receive an indication that a user plane has been set up 3) The UE performs a registration procedure or a service request procedure through non-3GPP. Here, the UE may request activation of the MA PDU session by including a list of PDU sessions to be activated in a registration/service request message. When receiving the request, an AMF reports the request to the SMF. The SMF performs a user plane setup procedure for non-3GPP access according to the requests received from the UE and the AMF.

4) The UE and an N3IWF generate an IPsec tunnel for the MA PDU through non-3GPP access, and accordingly the UE may recognize that the MA PDU session is successfully activated.

5) The UE receives a service acceptance message or a registration acceptance message. The UE may recognize that the user plane has been successfully set up based on a PDU session reactivation result included in the received message.

Since the user plane can be set up in the service request procedure/registration procedure, it is possible to quickly set up the user plane. However, the UE needs to actively request user plane setup.

Figure 13:
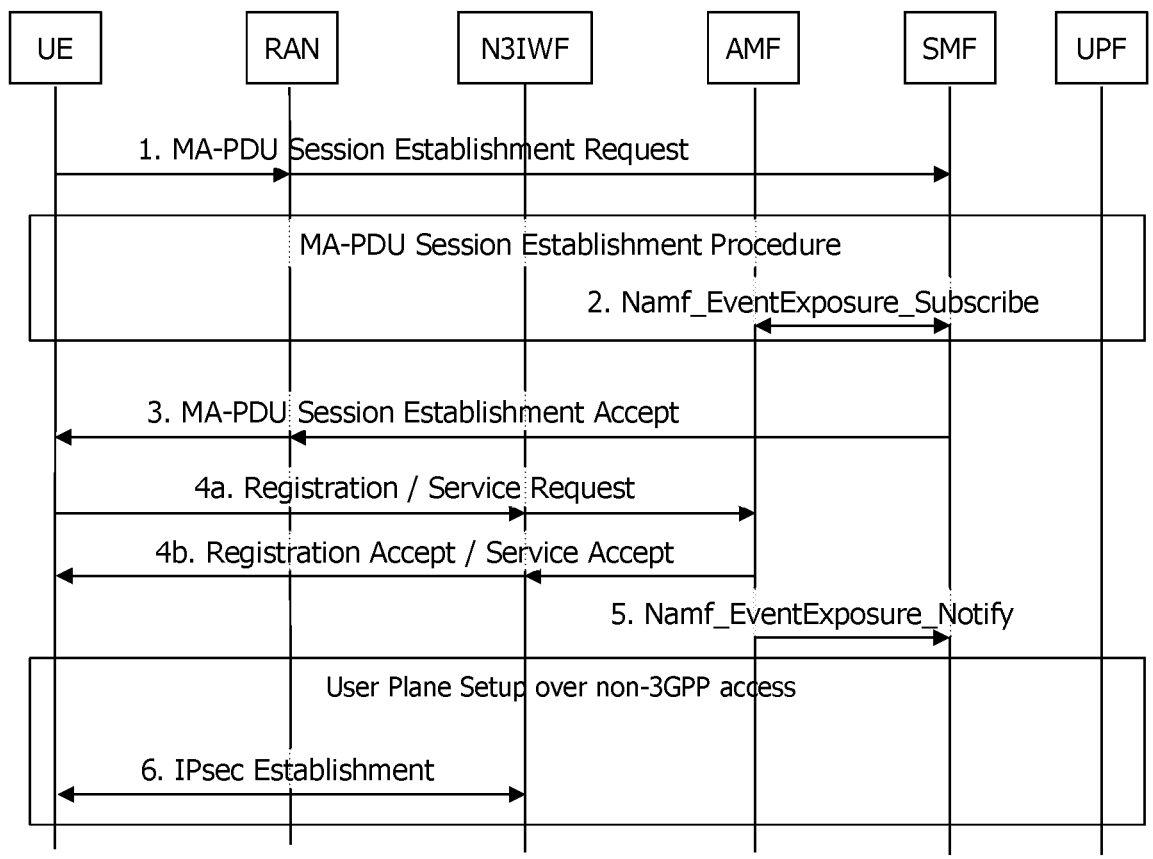
FIG. 13 illustrates a procedure in which a network initiates setup of a user plane according to a disclosure of the present specification.

FIG. 13 illustrates a procedure in which a network initiates setup of a user plane according to a disclosure of the present specification.

FIG. 13 shows a procedure in which a UE initiates setup of a user plane for non-3GPP access when an MA PDU session is generated in a state of being registered over only 3GPP access or being deregistered from non-3GPP access/idle over non-3GPP access.

1) The UE may transmit an MA PDU session establishment request through 3GPP access. A specific procedure has been described with reference to FIG. 11.

2) A process for generating an MA PDU session is performed. In the process for generating the MA PDU session, when an SMF accepts establishment of an MA PDU session and sets up a user plane over only one access, the SMF transmits a request for notification through Namf_EventExposure_Subscribe to the AMF in occurrence of an event in which the UE is registered (in the state of the UE being deregistered from non-3GPP access) or in occurrence of an event of transition to the connected state (in the state of the UE being deregistered from non-3GPP access or being idle over non-3GPP access).

3) An MA PDU session is established, and an SMF transmits an MA PDU session establishment acceptance message to the UE.

4a-4b) The UE transmits a registration request message or a service request message through non-3GPP access. The UE receives a registration acceptance message or a service request acceptance message through the AMF.

5) The AMF reports to the SMF that the UE is registered/connected based on the notification request from the SMF in process 2.

6) When receiving a notification of the event from the UE and the AMF, the SMF performs a user plane setup procedure for non-3GPP access. In this process, the UE and an N3IWF generate an IPsec tunnel for the MA PDU session through non-3GPP access, and accordingly the UE may recognize that the MA PDU session is successfully activated. In addition, the UE may recognize that the user plane has been successfully set up based on a PDU session reactivation result in the service request acceptance message or the registration acceptance message.

According to the procedure illustrated in FIG. 13, it is possible to set up a user plane without an additional operation of the UE. To this end, however, the AMF needs to make a notification request to the SMF and sets up a user plane according to a detected event after a registration procedure/service request procedure is over, thus complicating the procedure and slightly retarding a procedure of setting up the user plane.

The UE-initiated procedure illustrated in FIG. 12 and the network-initiated procedure illustrated in FIG. 13 may be used in combination. In the UE-initiated procedure, a list of PDU sessions to be activated is conventionally transmitted when there is data to be transmitted. Therefore, when there is no data to be transmitted, the UE may not configure and transmit a list of PDU sessions to be activated. In this case, when there is downlink data, even though the UE is registered over both accesses, a network may transmit data over only one access in an MA PDU. Therefore, even when the UE-initiated procedure is used in the network, if a user plane is generated over only one access while generating an MA PDU session, the SMF requests a notification of an event from the AMF, and thus the network-initiated procedure may be used together. That is, when there is user-plane data to be transmitted, the UE configures and transmits a list of PDU sessions to be activated according to the UE-initiated procedure, and the AMF reports to the SMF that the MA PDU session is included in the list if the MA PDU session is included in the list, thereby setting up a user plane. Further, the AMF reports that the UE is registered or connected according to the event of which a notification is requested by the SMF. When the AMF requests a notification of an event, if there is no request to set up a user plane from the AMF for a certain time, the SMF may set up a user plane according to the network-initiated procedure. Alternatively, the SMF may recognize that the UE is connected, and may set up a user plane when there is actual downlink data.

II. Second Disclosure

The second disclosure illustrates an improvement in 3GPP standard technology based on the methods according to the first disclosure.

Figure 14:
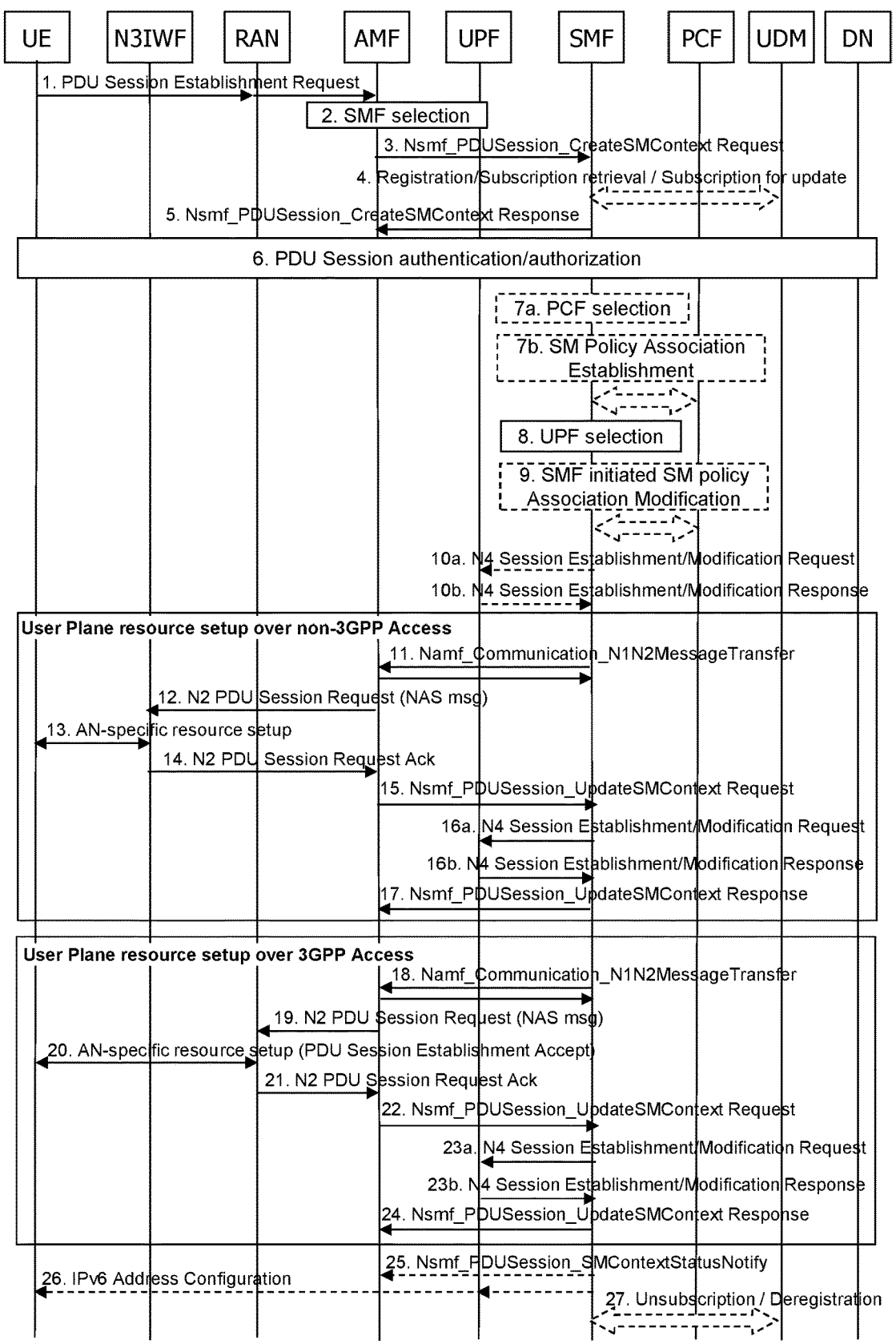
FIG. 14 is a flowchart illustrating a PDU session establishment process in a non-roaming case and an LBO roaming case.

FIG. 14 is a flowchart illustrating a PDU session establishment process in a non-roaming case and an LBO roaming case.

Hereinafter, improved procedures among processes illustrated in FIG. 14 will be mainly described.

1) A UE sets a request type in a PDU session establishment request message to "initial request". The message may include an MA PDU request indication.

2) An AMF selects an SMF. Here, the AMF sets and stores an access type as multi-access (MA). When an MA PDU request indication is included in the received message, the AMF may select an SMF supporting an ATSSS function.

3) When the AMF determines that the UE is registered via both accesses but requested S-NSSAI is not allowed on both accesses, the AMF may reject the multi-access PDU session establishment request.

The AMF determines the access type of access over which the message is received.

When the AMF supports the ATSSS function and the received message includes the MA-PDU request indication, the AMF may include the MA PDU request indication and RM state information of each access in a Nsmf_PDUSession_CreateSMContext request message.

7) When the received message includes the MA-PDU request indication, the SMF selects a PCF supporting the ATSSS function.

When the UE has ATSSS capability and MPTCP capability, the SMF may accept the PDU session establishment request based on the AMF capability, an operator policy and subscription information obtained from a UDM.

When dynamic PCC is deployed and both the AMF and the SMF support an MA PDU session, the SMF transmits an MA PDU request indication and associated access information to the PCF via the SM policy control create message. The PCF determines whether the MA PDU session is allowed based on the operator policy and the subscription information.

The PCF provides PCC rules related with the MA PDU session during a policy association establishment procedure.

From the received PCC rules, the SMF derives ATSSS rules, which will be transmitted to the UE to control traffic steering, and N4 rules.

8) The SMF selects an UPF supporting ATSSS capability and MPTCP capability.

11-17) When the UE is registered over second access, the SMF initiates user-plane resource setup over the second access (e.g. non-3GPP access) different from first access (e.g., 3GPP access) over which the PDU session establishment request is received.

The SMF may include an access type indicating the second access in a Namf_Communication_N1N2MessageTransfer message.

18-24) The SMF initiates user-plane resource setup over the first access over which the PDU session establishment request is received.

The SMF may include an access type indicating the first access in the Namf_Communication_N1N2MessageTransfer message.

When the SMF accepts PDU session establishment, the SMF may forward an N1 SM container (PDU session establishment acceptance message) having an ATSSS capability and/or MPTCP function indication and the ATSSS rules.

25) When the PDU session establishment request message received by the SMF includes information about the ATSSS capability and the MPTCP capability and the SMF determines to activate only one access PDU session, the SMF notifies associated access of the PDU session. Then, the AMF may update information about the access type of the PDU session.

The foregoing details may be implemented by hardware, which will be described with reference to a drawing.

Figure 15:
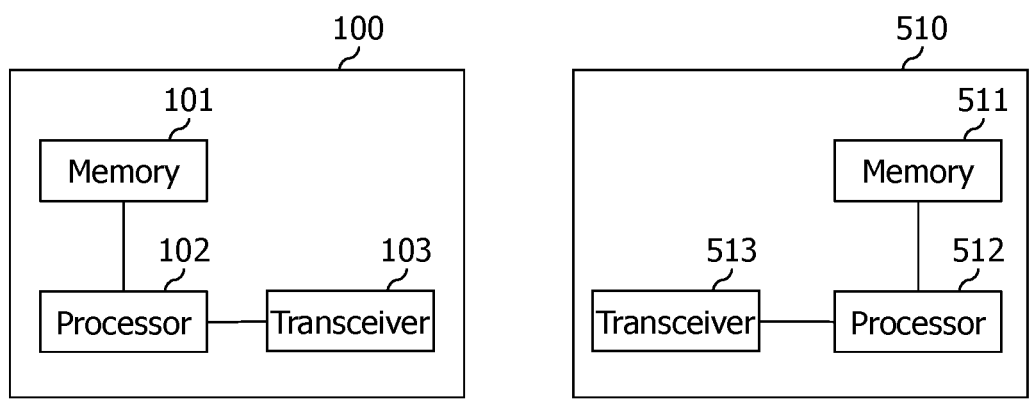
FIG. 15 is a block diagram illustrating the configuration of a UE and a network node according to an embodiment of the present disclosure.

FIG. 15 is a block diagram illustrating the configuration of a UE and a network node according to an embodiment of the present disclosure.

Referring to FIG. 15, the UE 100 includes a storage unit 101, a controller 102, and a transceiver 103. The network node may be any one of an AMF, an SMF, an NEF, and an AF. The network node includes a storage unit 511, a controller 512, and a transceiver 513.

The storage units store the foregoing methods.

The controllers control the storage units and the transceivers. Specifically, the controllers execute the methods stored in the storage units, respectively. The controllers transmit the foregoing signals through the transceivers.

Although the present disclosure has been shown and described with reference to exemplary embodiments, various changes, modifications, or improvements in form and detail may be made therein without departing from the spirit and scope of the present disclosure as defined by the appended claims.

What is claimed is:

1. A method for processing protocol data unit (PDU) session establishment by an access and mobility management function (AMF) node, the method comprising:
   receiving a PDU session establishment request message from a user equipment (UE) over any one of 3GPP (3rd Generation Partnership Project) access and non-3GPP access, the PDU session establishment request message comprising information indicating a multi-access (MA) PDU session;
   selecting a session management function (SMF) node supporting an MA PDU session based on the information indicating the MA PDU session;
   transmitting the PDU session establishment request message to the SMF node supporting the MA PDU session;
   transmitting, to the SMF, information indicating whether the UE is registered over both the 3GPP access and the non-3GPP access or is registered over only one thereof;
   receiving a request for notification from the SMF node in occurrence of a first event in which the UE is registered through the non-3GPP access or in occurrence of a second event of a switch to a connected state occurs when user plane setup for the MA PDU session is performed first through only the 3GPP access; and
   transmitting a notification to the SMF node when the first event or second event occurs.

2. The method of claim 1, further comprising:
   generating context of a PDU session based on the information indicating the MA PDU session,
   wherein the context of the PDU session comprises an access type, and
   the access type indicates both the 3GPP access and the non-3GPP access.

3. The method of claim 1, wherein the transmitting of the PDU session establishment request message comprises forwarding information indicating whether the UE is in an idle state or a connected state.

4. The method of claim 1, wherein the PDU session establishment request message comprises session network slice selection assistance information (S-NSSAI), and the delivering of the PDU session establishment request message comprises delivering allowed NSSAI for each access.

5. The method of claim 1, further comprising:
   identifying S-NSSAI of the MA PDU session is comprised in allowed NSSAI for corresponding access when the UE is registered through only any one of the 3GPP access and the non-3GPP access and when the UE is registered through another access; and
   transmitting a request for release of the MA PDU session to the SMF node when the S-NSSAI of the MA PDU session is comprised in the allowed NSSAI for the corresponding access.

6. The method of claim 1, further comprising:
   receiving a registration request message comprising a list of a PDU session to be activated from the UE when the UE is not registered over the non-3GPP access; and
   delivering necessity of activating the MA PDU session to the SMF node based on the list.

7. A method for processing protocol data unit (PDU) session establishment by a session management function (SMF) node, the method comprising:
   receiving, from an access and mobility management function (AMF) node, a PDU session establishment request message from a user equipment (UE), the PDU session establishment request message comprising information indicating a multi-access (MA) PDU session including 3GPP access and non-3GPP access;
   receiving, from the AMF, information indicating whether the UE is registered over both the 3GPP access and the non-3GPP access or is registered over only one thereof;
   transmitting a request for notification to the AMF node in occurrence of a first event in which the UE is registered through the non-3GPP access or in occurrence of a second event of a switch to a connected state occurs when user plane setup for the MA PDU session is performed first through only the 3GPP access;
   receiving a notification from the AMF node when the first event or second event occurs;

generating an MA PDU session through any one of the 3GPP access and the non-3GPP access or through both thereof based on the information indicating the MA PDU session; and delivering a PDU session establishment acceptance message.

8. The method of claim 7, wherein the receiving of the PDU session establishment request message comprises receiving information indicating whether the UE is in an idle state or a connected state.

9. The method of claim 7, wherein the receiving of the PDU session establishment request message comprises receiving one or more of session network slice selection assistance information (S-NSSAI) and allowed NSSAI for each access.

10. The method of claim 7, wherein the generating of the MA PDU session comprises:
performing user plane setup for the 3GPP access; and
performing user plane setup for the non-3GPP access.

11. The method of claim 7, wherein the PDU session establishment acceptance message comprises information indicating access for which user plane setup is performed among the 3GPP access and the non-3GPP access.

12. The method of claim 7, further comprising:
performing user plane setup for the non-3GPP access when the UE is registered over the non-3GPP access in a case where the MA PDU session is generated through only the 3GPP access in the generating of the MA PDU session.

13. The method of claim 7, further comprising:
transmitting a request for notification to the AMF node in occurrence of a first event in which the UE is registered through the non-3GPP access or in occurrence of a second event of a switch to a connected state occurs in a case where the MA PDU session is generated through only the 3GPP access in the generating of the MA PDU session.

14. An access and mobility management function (AMF) node for processing protocol data unit (PDU) session establishment, the AMF node comprising:
a transceiver; and
a processor to control the transceiver to receive a PDU session establishment request message from a user equipment (UE) over any one of 3GPP access and non-3GPP access,
wherein the PDU session establishment request message comprises information indicating a multi-access (MA) PDU session, and
wherein the processor selects a session management function (SMF) node supporting an MA PDU session based on the information indicating the MA PDU session and transmits the PDU session establishment request message to the SMF node supporting the MA PDU session,
wherein the processor transmits information indicating whether the UE is registered over both the 3GPP access and the non-3GPP access or is registered over only one thereof to the SMF,
wherein the processor receives a request for notification from the SMF node in occurrence of a first event in which the UE is registered through the non-3GPP access or in occurrence of a second event of a switch to a connected state occurs when user plane setup for the MA PDU session is performed first through only the 3GPP access, and
wherein the processor transmits a notification to the SMF node when the first event or second event occurs.

15. A session management function (SMF) node for processing protocol data unit (PDU) session establishment, the SMF node comprising:
a transceiver; and
a processor to control the transceiver to receive, from an access and mobility management function (AMF) node, a PDU session establishment request message from a user equipment (UE),
wherein the PDU session establishment request message comprises information indicating a multi-access (MA) PDU session including 3GPP access and non-3GPP access,
wherein the processor receives, from the AMF, information indicating whether the UE is registered over both the 3GPP access and the non-3GPP access or is registered over only one thereof,
wherein the processor transmits a request for notification to the AMF node in occurrence of a first event in which the UE is registered through the non-3GPP access or in occurrence of a second event of a switch to a connected state occurs when user plane setup for the MA PDU session is performed first through only the 3GPP access,
wherein the processor receives a notification from the AMF node when the first event or second event occurs, and
wherein the processor generates an MA PDU session through any one of the 3GPP access and the non-3GPP access or through both thereof based on the information indicating the MA PDU session and controls the transceiver to transmit a PDU session establishment acceptance message.

* * * * *